(12) United States Patent  (10) Patent No.: US 7,953,748 B2
Tanaka et al.  (45) Date of Patent: May 31, 2011

(54) INFORMATION PROCESSING APPARATUS AND INFORMATION PROCESSING METHOD, AND COMPUTER PROGRAM

(75) Inventors: Yoshiki Tanaka, Tokyo (JP); Yoichi Kobori, Kanagawa (JP); Norifumi Kikkawa, Tokyo (JP); Toshihiro Morita, Kanagawa (JP); Takehiko Morita, Kanagawa (JP); Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 10/543,468

(22) PCT Filed: Dec. 16, 2003

(86) PCT No.: PCT/JP03/16085
§ 371 (c)(1),
(2), (4) Date: Jun. 7, 2006

(87) PCT Pub. No.: WO2004/068354
PCT Pub. Date: Aug. 12, 2004

(65) Prior Publication Data
US 2006/0242152 A1  Oct. 26, 2006

(30) Foreign Application Priority Data
Jan. 29, 2003 (JP) ............... P2003-019818

(51) Int. Cl.
*G06F 7/00* (2006.01)
*G06F 15/16* (2006.01)
(52) U.S. Cl. .......... 707/769; 707/770; 707/203
(58) Field of Classification Search ........ 707/769
See application file for complete search history.

(56) References Cited

U.S. PATENT DOCUMENTS

| 5,659,732 | A | * | 8/1997 | Kirsch | 707/5 |
| 5,873,080 | A | * | 2/1999 | Coden et al. | 707/3 |
| 5,897,661 | A | * | 4/1999 | Baranovsky et al. | 711/170 |
| 5,924,090 | A | * | 7/1999 | Krellenstein | 707/5 |
| 6,496,791 | B1 | * | 12/2002 | Yates et al. | 703/25 |

(Continued)

FOREIGN PATENT DOCUMENTS

| JP | 2001-265895 | 9/2001 |
| JP | 2001-292413 | 10/2001 |
| JP | 2001-333410 | 11/2001 |
| JP | 2002-217894 | 8/2002 |
| JP | 2002-251350 | 9/2002 |
| JP | 2002-318803 | 10/2002 |

OTHER PUBLICATIONS

Merido V1.1 Developer's Guide, B1 WW-4991-01, Fujitsu Limited, Jan. 2000, pp. 2, 3, 0-92, 101-107, 205-214, 241-249. Jacinto M. H. et al., "Constraint Specification Languages: comparing XCSL, Schematron and XML-Schemas," XP002256949, May 20, 2002, pp. 1-30.
European Search Report for EP 03 77 8956 dated Feb. 18, 2008, (2 pages).

*Primary Examiner* — Apu M Mofiz
*Assistant Examiner* — Mohammad N Rahman
(74) *Attorney, Agent, or Firm* — Finnegan, Henderson, Farabow, Garrett & Dunner, L.L.P.

(57) ABSTRACT

Apparatus and a method are provided, which efficiently and properly execute information update processing and content reproduction processing based on transmission processing of content information from a server to a client. The server owning content attribute information extracts metadata based on an information acquisition request from the client, to generate the content information based on property information which is a component of the metadata, and for each property, sets data editing information allowed by each piece of the property information to transmit to the client. Furthermore, the server generates the content information including data mode information by which processing capability in a device on the client side can be judged, such as record quality level information and codec information, as the data mode information of the contents.

26 Claims, 14 Drawing Sheets

U.S. PATENT DOCUMENTS

| | | |
|---|---|---|
| 6,757,900 B1 * | 6/2004 | Burd et al. .................... 719/316 |
| 7,016,892 B1 * | 3/2006 | Kokkonen et al. ................ 707/3 |
| 2002/0059325 A1 * | 5/2002 | Beizer et al. ................. 707/203 |
| 2002/0069105 A1 * | 6/2002 | do Rosario Botelho et al. .................. 705/14 |
| 2002/0116392 A1 | 8/2002 | McGrath et al. |
| 2002/0138640 A1 * | 9/2002 | Raz et al. ...................... 709/231 |
| 2002/0184223 A1 | 12/2002 | Miura |
| 2003/0004951 A1 | 1/2003 | Chokshi |
| 2004/0111465 A1 * | 6/2004 | Chuang et al. ................ 709/203 |
| 2006/0218167 A1 * | 9/2006 | Bosley et al. ................. 707/100 |

\* cited by examiner

```xml
<?xml version="1.0">
<av:PropertiesInfo xmlns:av ="urn:schemas-sony-com:av">
    <av:PropertyInfo>
        <av:PropertyName>dc:title</av:PropertyName>
        <av:MinOccurred>1</av:MinOccurred>
        <av:MaxOccurred>1</av:MaxOccurred>
        <av:OperationCode>rcw</av:OperationCode>
    </av:PropertyInfo>
    ...
    <av:PropertyInfo>
        <av:PropertyName>upnp:artist</av:PropertyName>
        <av:MinOccurred>0</av:MinOccurred>
        <av:MaxOccurred>1</av:MaxOccurred>
        <av:OperationCode>rcwad</av:OperationCode>
    </av:PropertyInfo>
    ...
    <av:PropertyInfo>
        <av:PropertyName>av:recordQualityLevel</av:PropertyName>
        <av:MinOccurred>1</av:MinOccurred>
        <av:MaxOccurred>1</av:MaxOccurred>
        <av:OperationCode>rcw</av:OperationCode>
        <av:AllowedValueRange>
                <av:Minimum>3</av:Minimum>
                <av:Maximum>5</av:Maximum>
                <av:Step>1</av:Step>
        </av:AllowedValueRange>
    </av:PropertyInfo>
    ...
    <av:PropertyInfo>
        <av:PropertyName>av:recordStatus</av:PropertyName>
        <av:MinOccurred>1</av:MinOccurred>
        <av:MaxOccurred>1</av:MaxOccurred>
        <av:OperationCode>r</av:OperationCode>
        <av:AllowedValueList>
                <av:AllowedValue>NotYet</av:AllowedValue>
                <av:AllowedValue>Timed</av:AllowedValue>
                <av:AllowedValue>Recording</av:AllowedValue>
                <av:AllowedValue>Recorded</av:AllowedValue>
        </av:AllowedValueList>
    </av:PropertyInfo>
    ...
</av:PropertiesInfo >
```

- 301: dc:title PropertyInfo
- 302: upnp:artist PropertyInfo
- 303: av:recordQualityLevel PropertyInfo
- 304: av:recordStatus PropertyInfo

*Fig. 5*

| av:PropertyName | string | dc:title | NAME OF PROPERTY (WRITTEN IN EACH namespace, e.g. SortCriteria) |
|---|---|---|---|
| av:MinOccurred | unsigned integer | 1 | THE MINIMUM NUMBER OF THE RELEVANT PROPERTIES PER OBJECT OF A DESIGNATED CLASS THAT SHOULD EXIST IN THE SERVER. |
| av:MaxOccurred | unsgned integer | 1 | THE MAXIMUM NUMBER OF THE RELEVANT PROPERTIES PER OBJECT OF THE DESIGNATED CLASS THAT SHOULD EXIST IN THE SERVER. WHEN THERE IS NO LIMITATION, THIS TAG IS NOT ATTACHED. |
| av:OperationCode | formatted string | rwc | APPROPRIATE CHARACTERS OF THE FOLLOWING ARE ARRANGED.<br>r...EXIST IN AN OBJECT RETURNED FROM THE SERVER SUCH AS Browse AND Search.<br>c...ENABLED TO BE DESIGNATED AT THE TIME OF CreateObject.<br>w...ENABLED TO BE REWRITTEN WITH UpdateObject.<br>a...ENABLED TO BE INCREASED WITH UpdateObject.<br>d...ENABLED TO BE DELETED WITH UpdateObject.<br>s...ENABLED TO BE INCLUDED IN SortCriteria WITH Browse/Search. |
| av:AllowedValueList | - | - | DESIGNATED WHEN A LISTING OF VALUES ALLOWED BY THE PROPERTY IS DETERMINED.<br>WHEN THERE ARE NO TAGS OF BOTH OF THIS AND AllowedValueRange, NO CLEAR LIMITATION IN THE ALLOWED VALUES EXISTS.<br>WHEN THE PROPERTY TYPE IS CSV, ONLY ONE IS ARRANGED AND NOT ALL PATTERNS NEED TO BE ENUMERATED.<br>THE RESPECTIVE VALUES ARE ARRANGED AS Vlaue OF AllowedValue. |
| av:AllowedValue | depends on property | PLAY | ALLOWED VALUES. |
| av:AllowedValueRange | - | - | DESIGNATED WHEN THERE IS SOME LIMITATION IN THE RANGE OF THE VALUES ALLOWED BY THE PROPERTY.<br>WHEN THERE ARE NO TAGS OF BOTH OF THIS AND AllowedValueList, NO LIMITATION IN THE ALLOWED VALUES EXISTS.<br>FOR RANGE, Vlaue OF Minimum, Maximum, Step ARE ARRANGED. |
| av:Minimum | depends on property | 1 | A MINIMUM VALUE ALLOWED BY THE PROPERTY. WHEN THERE IS NO MINIMUM VALUE, THIS TAG IS NOT ATTACHED. |
| av:Maximum | depends on property | 1 | A MAXIMUM VALUE ALLOWED BY THE PROPERTY. WHEN THERE IS NO MAXIMUM VALUE, THIS TAG IS NOT ATTACHED. |
| av:Step | depends on property | 1 | WHEN ALLOWED VALUES ARE DETERMINED AT CONSTANT INCREMENT, THE INCREMENT IS SHOWN. OTHERWISE, THIS TAG IS NOT ATTACHED. |

*Fig.6*

| CLASS NAME | DESCRIPTION |
|---|---|
| avmusicTrack | TUNE |
| avMusicAlbum | ALBUM<br>HAS avMusicTrack AS A CHILD. |
| avMusicGenre | GENRE IN "GENRE LISTING"<br>HAS avMusicArtist, avMusicAlbum OR avMusicTrack AS A CHILD. |
| avMusicArtist | ARTIST IN "ARTIST LISTING"<br>HAS avMusicAlbum OR avMusicTrack AS A CHILD. |
| avMusicPlaylist | PLAYLISTING IN "PLAYLIST LISTING" CONTAINER<br>HAS avMusicTrack COMPOSING THE PLAYLIST AS A CHILD. |
| avMusicSearchavMusicSearch | PLAYLIST IN "VARIOUS SEARCHES" CONTAINER, WHICH A SERVER AUTOMATICALLY GENERATES<br>HAS avMusicTrack COMPOSING THE PLAYLIST AS A CHILD. |
| avMusicPlaylistFolder | PLAYLIST CONTAINER<br>HAS avMusicPlaylistFolder OR avMusicPlaylist AS A CHILD.<br>THE REASON WHY PlaylistContainer IS NOT TAKEN OVER IS TO AVOID A CONFLICT WITH avMusicPlaylist IN CHARACTER STRING MATCHING. |
| avMusicAlbumCabinet | ALBUM CABINET<br>HAS avMusicAlbum AS A CHILD. |
| avAllavAllMusicTracks | "ALL TUNES" CONTAINER<br>A CHILD IS avMusicTrack. |
| avAllavAllMusicAlbums | "ALBUM LISTING" CONTAINER<br>A CHILD IS avMusicAlbum. |
| avAllavAllMusicArtists | "ARTIST LISTING" CONTAINER<br>A CHILD IS avMusicArtist. |
| avAllavAllMusicGenre | "GENRE LISTING" CONTAINER<br>A CHILD IS avMusicGenre. |
| avAllavAllMusicPlaylists | "PLAYLIST LISTING" CONTAINER<br>A CHILD IS avMusicPlaylist OR avMusicPlaylistFolder. |
| avAllMusicSearch | "VARIOUS SEARCHES" CONTAINER<br>A CHILD IS avMusicSearchavMusicSearch. |
| avAllMusicAlbumCabinets | "ALBUM CABINET LISTING" CONTAINER<br>A CHILD IS avMusicAlbumCabinet. |

Fig.9

| PROPERTY NAME | TYPE | MULTIPLE | PROPERTY DESCRIPTION |
|---|---|---|---|
| av:totalSize | unsigned long | no | SIZE OF THE RESOURCE INCLUDED IN THE CONTAINER (ORIGINAL SIZE). THIS MAY BE AN APPROXIMATIVE VALUE. IN BYTES. |
| av:totalDuration | duration | no | TOTAL TIME OF THE RESOURCE INCLUDED IN THE CONTAINER. THIS MAY BE AN APPROXIMATIVE VALUE. |
| av:recordQualityLevel | integer | no | QUALITY LEVEL OF THE CONTENT {1, 2, 3, 4, 5, 6, 7} IN THE CASE OF A MOVING IMAGE, ABOUT 3...2Mbps, 4...4Mbps, AND 5...8Mbps ARE ROUGH STANDARDS. THIS IS NOT DETERMINED EXACTLY. WHEN QUALITY LEVEL IS DIFFERENT IN A PLURALITY OF res'ES, THE HIGHEST ONE IS PUT (IN EACH res, res@av:recordQualityLevel IS PUT). |
| av:originalFileFormat | string | no | MIME-Type OF THE ORIGINAL DATA (BEFORE CONVERSION). WHEN IT IS NOT KNOWN, application/octet-stream. |
| av:originalCodec | string | no | CODEC OF THE ORIGINAL DATA (BEFORE CONVERSION). WHEN IT IS NOT KNOWN, THIS TAG IS NOT ATTACHED. AllowedValueList IS DEFINED SIMILAR TO THAT OF res@av:codec. |
| av:originalResolution | resolution | no | RESOLUTION OF THE ORIGINAL DATA (IMAGE) (BEFORE CONVERSION). |
| res@protocolInfo | string | no | [CONVERSION attribute] INFORMATION OF A FILE FORMAT (MIME-Type) IS ALSO INCLUDED IN THIS. ALSO USED AT THE TIME OF DATA CONVERSION. |
| res@av:codec | string | no | [CONVERSION attribute] CODEC FOR AllowedValue, REFER TO Table 14. |
| res@size | unsigned long | no | [CONVERSION attribute] Size in bytes of the resource. |

| ALLOWED VALUE | DESCRIPTION |
|---|---|
| MPEG1L3 | MPEG1 layer 3 |
| ATRAC3 | ATRAC3 |
| ATRAC3plus | ATRAC-X |
| PCM | WAV, LPCM |
| JPEG | JPEG |
| CLUT8 | GIF |
| RGB16 | TIFF, BMP |
| RGB24 | TIFF, BMP, PNG |
| JPEG | TIFF |
| YUV420 | YUV |
| MPEG1V | MPEG1 PS |
| MPEG2V | MPEG2 PS |
| MPEG4V | MPEG4 |

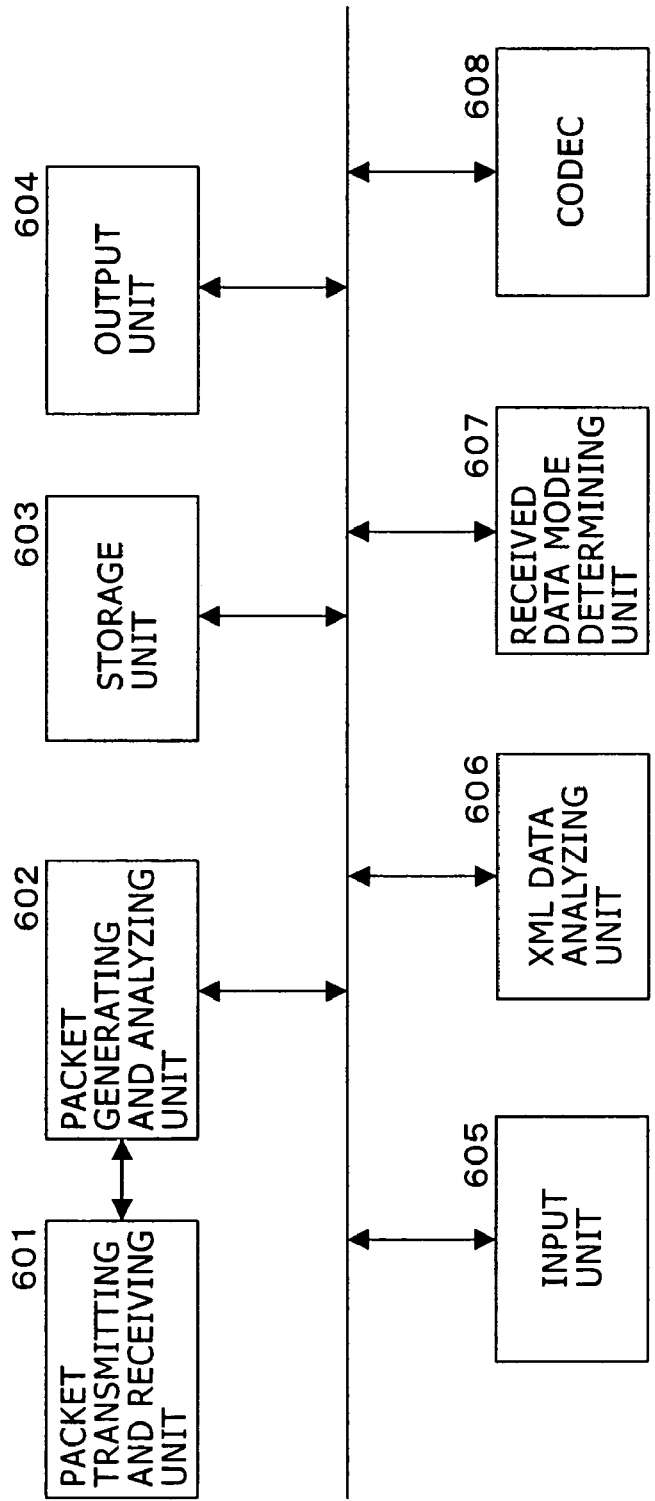

INFORMATION PROCESSING APPARATUS AND INFORMATION PROCESSING METHOD, AND COMPUTER PROGRAM

TECHNICAL FIELD

The present invention relates to an information processing apparatus and an information processing method, and a computer program. More specifically, the present invention relates to an information processing apparatus and an information processing method, and a computer program, in which in a configuration executing communications between devices connected to a network such as a home network, details of metadata as attribute information of contents that a content providing server has can be provided to a client, and on the client side, the update of the metadata or a more proper content acquisition and reproduction processing based on the meta data is enabled.

BACKGROUND ART

As a data communication network becomes more and more popular today, a so-called home network where electrical home appliances, computers, and other peripheral units are networked to enable communication among them is becoming widely used in the home. A home network, which allows communication among networked devices to share the data processing function and to transmit and receive contents among them, provides the user with convenience and comfort. It is expected that a home network will become more widely used in future.

As a protocol suitable for the configuration of such a home network, there is known Universal Plug and Play (UPnP). Universal Plug and Play (UPnP) allows the user to easily build a network without complicated operations and allows the user on a networked device to receive the services provided by the connected devices without difficult operations and settings. Another advantages with UPnP are that it does not depend on the OS (Operating System) on a device and that devices can be added easily.

Under UPnP, a definition file conforming to XML (extensible Markup Language) is exchanged among devices for mutual recognition. The overview of UPnP is as follows:

(1) Addressing processing for acquiring its own device ID such as an IP address (2) Discovery processing for searching for the devices in the network and, upon receiving responses from the devices, acquiring information, such as the device type and the function, included in the responses.

(3) Service request processing for requesting a device to provide a service based on the information acquired by the discovery processing By executing the processing procedure described above, the services can be provided and received by applying devices connected to the network. A device newly connected to a network can perform the addressing processing described above to acquire the device ID, perform the discovery processing to acquire information on other devices connected to the network and, based on the acquired information, issue a service request to the other devices.

For example, when a user wants to reproduce a content, such as music data and image data stored in a server, on the client side device, the client side transmits an acquisition request to the server to transmit content information stored in the server, for example, various types of content attribute information such as the title or the artist name of a tune or a movie, data compression mode information (ATRAC: adaptive transform acoustic coding, MPEG: moving picture experts group, etc.) and, as necessary, copyright information. This attribute information is called metadata or meta information.

In response to the request from the client, the server transmits metadata (attribute information) of the content, owned by the server, to the client. Based on the metadata acquired from the server, the content information is displayed on a display of the client device according to a predetermined display program. For example, a tune list composed of artist names and titles is displayed on the display. Based on the display information, the user checks or selects a content to be reproduced and transmits a content transmission request to the server. The server receives the content request from the client and, according to the received request, transmits the content to the client, and the client side reproduces the received content.

In this way, a content stored in the server in the home network can be accessed from other devices connected to the network. For example, a device connected based on the UPnP connection that is a simple device connection structure described above can acquire a content. When the content is movie data or music data, a TV set or a player connected as a network connection device enables the user to watch a movie or listen to music.

However, the metadata transmitted and received between devices defined in UPnP, for example, between a server and a client, is uniform, so that in devices having various functions, some metadata received from the server may be insufficient.

For example, in the metadata received from the server, there may exist data which allows update processing such as rewrite, deletion and addition. In a case where, for example, a content list is displayed on the client device based on the metadata received from the server, under the existing UPnP, the transmission processing of data for judging which data is allowed to be rewritten, or which data can be subjected to delete and addition processing is not performed. Therefore, the user is required to perform try-and-error type processing in which the user actually tries executing data input in each data field to thereby execute metadata update processing.

As related art disclosed relating to the processing such as rewrite and addition of the metadata, for example, Patent Document 1 (Japanese Published Application Publication No. 2001-292413) can be cited. In Patent Document 1, there is described a structure in which metadata is written every working step in an image processing system gathering, editing/processing, and storing video/audio in a production company of a news program or the like. For example, while an outside broadcast van is moving to a news coverage site, metadata considered in a planning step is transmitted from a data managing apparatus at a broadcast station to an image pick-up apparatus at the news coverage site, and in a coverage step, metadata automatically generated, in addition to the metadata transmitted from the broadcast station, is recorded on a recording medium. In this manner, there is shown a structure which enables writing processing of various types of metadata in respective steps in a recording and reproducing apparatus, editing apparatus or the like. However, in this related art, there is not shown any means clearly indicating a range in which the update of the metadata, such as rewrite, addition, deletion allowed in respective steps or an apparatus, and the like, is enabled.

Furthermore, the metadata includes various data items such as a title, playing time, and data recording date and time, and a data mode in which input is enabled is defined for each data item; for example, only text data, only numeric data or only integer data can be inputted. In addition, in the case of the numeric data, a range of values that can be inputted may be defined. In the case of the text data, the number of input characters and the like may be defined. However, in the existing UPnP, since notification processing of the data mode in which input is enabled or the like is not performed between the devices at the time of transmitting and receiving the metadata, the try-and-error type processing is needed as in the foregoing.

Moreover, with respect to the server providing the content to the client, a server, such as an image data providing server and an audio data providing server, is often provided for each content that the server can provide. These respective servers own the contents in different data modes. For example, ATRAC3, ATRAC3plus, MPEG1, MPEG2, MPEG4 or the like are exemplified.

Although the client side can acquire the types of contents that the server owns in the discovery processing in UPnP, means for acquiring the details of the data modes is insufficient. Even if it is notified that the data is MPEG data, notification processing of the details including whether it is MPEG 2 or MPEG4 is insufficient, which disadvantageously results in an improper data selection or data transmission request by the user on the client side.

DISCLOSURE OF THE INVENTION

The present invention is contrived in light of the above-described problems in the related art, and it is an object to provide an information processing apparatus and an information processing method, and a computer program, in which a client acquires, in more detailed mode, attribute information of contents owned by a server storing various contents, and when the client side updates data displayed based on transmitted information from the server, allowed update-processing contents can be comprehended in advance, and with less burden on a user, easy and proper update of the attribute information is enabled.

Furthermore, it is another object of the present invention to provide an information processing apparatus and an information processing method, and a computer program, in which detailed data modes of contents which can be owned or provided by a server provided for each content that the individual server such as an image data providing server and an audio data providing server can provide, respectively, for example, detailed information of ATRAC3, ATRAC3PLUS, MPEG1, MPEG2, MPEG4 or the like can be acquired based on a request from a client, and optimal data-transmission and reproduction processing matching the function that the client has or the like are realized.

A first aspect of the present invention is an information processing apparatus which executes content information transmission processing, characterized by including:
 a storage unit storing contents and metadata as content attribute information;
 a data transmitting and receiving unit executing data transmission and reception processing with a client as a content information request apparatus; and
 a control unit extracting the metadata from the storage unit in response to receipt of a content information acquisition request from the client and generating content information to be transmitted to the client based on property information which is a component of metadata;
 wherein the control unit has a structure in which the content information is generated by defining data editing information allowed for each piece of the property information for each property, and the generated content information is transmitted via the data transmitting and receiving unit.

Furthermore, in one embodiment of the information processing apparatus of the present invention, the information processing apparatus is characterized in that the control unit is configured to execute the generation processing of the content information by generating XML (eXtensible Markup Language) data in which the data editing information is described for each property.

Furthermore, in one embodiment of the information processing apparatus of the present invention, the information processing apparatus is characterized in that the metadata is managed based on class set as content classification, and the control unit is configured to execute processing in which the metadata corresponding to a designated class is extracted from the storage unit based on the receipt of a content information acquisition request with class designation from the client, and the content information including the data editing information for each piece of property information to be transmitted to the client is generated based on the property information which is a component of the metadata.

Furthermore, in one embodiment of the information processing apparatus of the present invention, the information processing apparatus is characterized in that the metadata is managed based on class set as content classification, and the control unit is configured to execute processing in which listing information of the class managed in the information processing apparatus is generated as transmission information to the client based on the receipt of a content information acquisition request with no class designation from the client.

Furthermore, in one embodiment of the information processing apparatus of the present invention, the information processing apparatus is characterized in that the data editing information includes information in which whether or not at least any processing of rewrite processing, addition processing, and deletion processing of the property information is enabled is set.

Furthermore, in one embodiment of the information processing apparatus of the present invention, the information processing apparatus is characterized in that the data editing information includes information defining an allowed data value of the property information.

Furthermore, a second aspect of the present invention is an information processing apparatus which performs acquisition processing of content information, characterized by including:
 a data transmitting and receiving unit executing data transmission and reception processing with a server owning the content information;
 a control unit generating display information to be displayed on an output unit, based on the content information received from the server via the data transmitting and receiving unit; and
 a display unit outputting and displaying the display information generated by the control unit;
 wherein the control unit is configured to execute the generation processing of the display information in which data editing information can be identified for each piece of property information as component of the content information received from the server.

Furthermore, in one embodiment of the information processing apparatus of the present invention, the information processing apparatus is characterized in that the content information received from the server is XML (eXtensible Markup Language) data in which the data editing information is described for each property, and the control unit is configured to execute, by analysis of the XML data, the generation processing of the display information in which the data editing information for each piece of property information can be identified.

Furthermore, in one embodiment of the information processing apparatus of the present invention, the information processing apparatus is characterized in that the data editing information includes information in which whether or not at least any processing of rewrite processing, addition processing, and deletion processing of the property information is enabled is set, and the control unit is configured to execute the generation processing of the display information having a mode in which whether or not at least any processing of rewrite processing, addition processing, and deletion processing is enabled can be identified.

Furthermore, in one embodiment of the information processing apparatus of the present invention, the information processing apparatus is characterized in that the data editing information includes information defining an allowed data value of the property information, and the control unit is configured to execute the generation processing of the display information having a mode in which the allowed data value can be identified for each piece of the property information.

Furthermore, a third aspect of the present invention is an information processing apparatus which executes content information transmission processing, characterized by including:

a storage unit storing contents and metadata as a content attribute information;

a data transmitting and receiving unit executing data transmission and reception processing with a client as content information request apparatus; and a control unit extracting the metadata from the storage unit in response to receipt of a content information acquisition request from the client and generating content information to be transmitted to the client based on property information as component of the metadata, the control unit has a structure in which the content information including data mode information by which processing capability in a device on the client side can be judged is generated, as data mode information of the content data which can be transmitted to the client, and the generated content information is transmitted via the data transmitting and receiving unit.

Furthermore, in one embodiment of the information processing apparatus of the present invention, the information processing apparatus is characterized in that the metadata is managed based on class set as content classification, and the control unit is configured to execute processing in which the metadata corresponding to a designated class is extracted from the storage unit based on the receipt of a content information acquisition request with class designation from the client, and the content information including the data mode information of the content data to be transmitted to the client is generated based on the property information which is a component of the metadata.

Furthermore, in one embodiment of the information processing apparatus of the present invention, the information processing apparatus is characterized in that the metadata is managed based on class set as content classification, and the control unit is configured to execute processing in which listing information of the class managed in the information processing apparatus is generated as transmission information to the client based on the receipt of a content information acquisition request with no class designation from the client.

Furthermore, a fourth aspect of the present invention is an information processing method for executing content information transmission processing, characterized by including:

a content information acquisition request receiving step of receiving a content information acquisition request from a client;

a content information generating step of generating content information to be transmitted to the client based on property information which is a component of the metadata, by extracting metadata as content attribution information from a storage unit; and a content information transmitting step of transmitting the generated content information to the client via a data transmitting and receiving unit;

wherein in the content information generating step, the generation processing of the content information defining data editing information allowed by each piece of the property information for each property is executed.

Furthermore, in one embodiment of the information processing method of the present invention, the information processing method is characterized in that the content information generating step executes the generation processing of the content information by generating XML (eXtensible Markup Language) data in which the data editing information is described for each property.

According to one embodiment of the information processing method of the present invention, the information processing method is characterized in that the metadata is managed based on class set as content classification, and the content information generating step executes processing in which the metadata corresponding to a designated class is extracted from the storage unit based on the receipt of a content information acquisition request with class designation from the client, and the content information including the data editing information for each piece of property information to be transmitted to the client is generated based on the property information which is a component of the metadata.

Furthermore, in one embodiment of the information processing method of the present invention, the information processing method is characterized in that the metadata is managed based on class set as content classification, and the content information generating step executes processing in which listing information of the class managed in information processing apparatus is generated as transmission information to the client based on the receipt of a content information acquisition request with no class designation from the client.

Furthermore, in one embodiment of the information processing method of the present invention, the information processing method is characterized in that the data editing information includes information in which whether or not at least any processing of rewrite processing, addition processing, and deletion processing of the property information is enabled is set.

Furthermore, in one embodiment of the information processing method of the present invention, the information processing method is characterized in that the data editing information includes information defining an allowed data value of the property information.

Furthermore, a fifth aspect of the present invention is an information processing method for executing acquisition processing of content information, characterized by including:

a display information generating step of generating display information displayed on an output unit, based on content information received from a server via a data transmitting and receiving unit; and a displaying step of outputting and displaying the display information;

wherein the display information generating step executes the generation processing of the display information in which data editing information can be identified for each piece of property information as component of the content information received from the server.

Furthermore, in one embodiment of the information processing method of the present invention, the information processing method is characterized in that the content information received from the server is XML (eXtensible Markup Language) data in which the data editing information is described for each property, and the display information generating step executes, by analysis of the XML data, the generation processing of the display information by which the data editing information for each piece of property information can be identified.

Furthermore, in one embodiment of the information processing method of the present invention, the information processing method is characterized in that the data editing information includes information in which whether or not at least any processing of rewrite processing, addition processing, and deletion processing of the property information is enabled is set, and the display information generating step executes the generation processing of the display information having a mode by which whether or not at least any processing of rewrite processing, addition processing, and deletion processing is enabled can be identified.

Furthermore, in one embodiment of the information processing method of the present invention, the information processing method is characterized in that the data editing information includes information defining an allowed data format of the property information, and the display information generating step executes the generation processing of the display information having a mode by which the allowed data format can be identified for each piece of the property information.

Furthermore, in one embodiment of the information processing method of the present invention, the information processing method is characterized in that the data editing information includes information defining an allowed data value of the property information, and the display information generating step executes the generation processing of the display information having a mode by which the allowed data value can be identified for each piece of the property information.

Furthermore, a sixth aspect of the present invention is an information processing method for executing content information transmission processing, characterized by including:

a content information acquisition request receiving step of receiving a content information acquisition request from a client;

a content information generating step of generating content information to be transmitted to the client based on property information which is a component of the metadata, by extracting metadata as content attribution information from a storage unit; and a content information transmitting step of transmitting the generated content information to the client via a data transmitting and receiving unit;

wherein in the content information generating step, the generation processing of the content information including data mode information by which processing capability in a device on the client side can be judged is executed, as data mode information of the content data which can be transmitted to the client.

Furthermore, in one embodiment of the information processing method of the present invention, the information processing method is characterized in that the metadata is managed based on class set as content classification, and the content information generating step executes processing in which the metadata corresponding to a designated class is extracted from the storage unit in response to receipt of a content information acquisition request with class designation from the client, and the content information including the data mode information of the content data to be transmitted to the client is generated based on the property information which is a component of the metadata.

Furthermore, in one embodiment of the information processing method of the present invention, the information processing method is characterized in that the metadata is managed based on class set as content classification, and the content information generating step executes processing in which listing information of the classes managed in an information processing apparatus is generated as transmission information to the client based on the receipt of a content information acquisition request with no class designation from the client.

Furthermore, a seventh aspect of the present invention is a computer program executing content information transmission processing, characterized by comprising:

a content information acquisition request receiving step of receiving a content information acquisition request from a client;

a content information generating step of generating content information to be transmitted to the client based on property information which is a component of the metadata by extracting metadata as content attribution information from a storage unit; and a content information transmitting step of transmitting the generated content information to the client via a data transmitting and receiving unit;

wherein the content information generating step is a step of executing the generation processing of the content information defining data editing information allowed by each piece of the property information for each property.

Furthermore, an eighth aspect of the present invention is a computer program executing acquisition processing of content information, characterized by comprising:

a display information generating step of generating display information displayed on an output unit, based on content information received from a server via a data transmitting and receiving unit; and a displaying step of outputting and displaying the display information;

wherein the display information generating step includes a step of executing the generation processing of the display information in which data editing information can be identified for each piece of property information included in the content information received from the server, as component of the content information.

Furthermore, a ninth aspect of the present invention is a computer program executing content information transmission processing, characterized by comprising:

a content information acquisition request receiving step of receiving a content information acquisition request from a client;

a content information generating step of generating content information to be transmitted to the client based on property information which is a component of the metadata, by extracting metadata as content attribution information from a storage unit; and a content information transmitting step of transmitting the generated content information to the client via a data transmitting and receiving unit;

wherein the content information generating step is a step of executing the generation processing of the content information including data mode information by which processing capability in a device on the client side can be judged, as data mode information of the content data which can be transmitted to the client.

According to the structure of the present invention, a server owning attribution information of contents extracts metadata corresponding to the contents based on the receipt of a content information acquisition request from a client, and generates content information based on property information which is a component of the metadata, and at the same time, sets data editing information allowed by each piece of the property information, for each property to transmit to the client. Consequently, in the client, proper editing processing of the property information based on the received information can be efficiently and surely executed.

Furthermore, according to the structure of the present invention, the client side receiving the content information from the server executes the generation processing of display information in which the data editing information can be identified for each piece of the property information as component of the received content information to display on the display. Consequently, in the client, proper editing processing of the property information based on the received information can be efficiently and surely executed.

Furthermore, according to the structure of the present invention, there is generated content information including data mode information by which processing capability in a device on the client side can be judged, such as record quality level information indicating a content recording quality, or codec information indicating a content coding mode, as the data mode information of the content data which can be transmitted from the server to the client, and the content information is transmitted to the client. Consequently, in the client, proper content selection processing based on the received information can be efficiently executed.

Furthermore, according to the structure of the present invention, the metadata as content attribute information managed on the server side is managed based on class set as content classification. Consequently, on the client side, acquisition processing of property information with class designation is enabled, so that various classes such as tunes, albums, genres, and album cabinets in each of which a plurality of albums are collected can be designated to acquire the property information.

A computer program of the present invention is, for example, a computer program which can be provided to a general-purpose computer system capable of executing various program codes, through a recording medium or communication medium, for example, recording medium such as a CD, FD and MO, or communication medium such as a network, which provides the program in a computer-readable format. By providing such a program in a computer-readable format, processing according to the program on the computer system is realized.

Still other objects, characteristics and advantages of the present invention will be made clear by more detailed description, based on the embodiments of the present invention described later and the accompanying drawings. The system in the present specification has a logical assembly configuration of a plurality of devices, and is not limited to that in which the respective devices in the configuration are in the same housing.

BRIEF DESCRIPTION OF DRAWINGS

FIG. 5 is a diagram for explaining an example of XML data structure composed of property information transmitted from the server to the client.

FIG. 6 is a diagram for explaining a structure of the property information composing metadata which is set corresponding to content data.

FIG. 9 is a diagram for explaining classes utilizable as designation information of the property information to be transmitted to the server.

FIG. 10 is a diagram showing an example of the property information transmitted from the server to the client.

FIG. 11 is a diagram showing allowed values of codec in the property information.

FIG. 14 is a block diagram for explaining a processing function of the client.

BEST MODE FOR CARRYING OUT THE INVENTION

Figure 1:
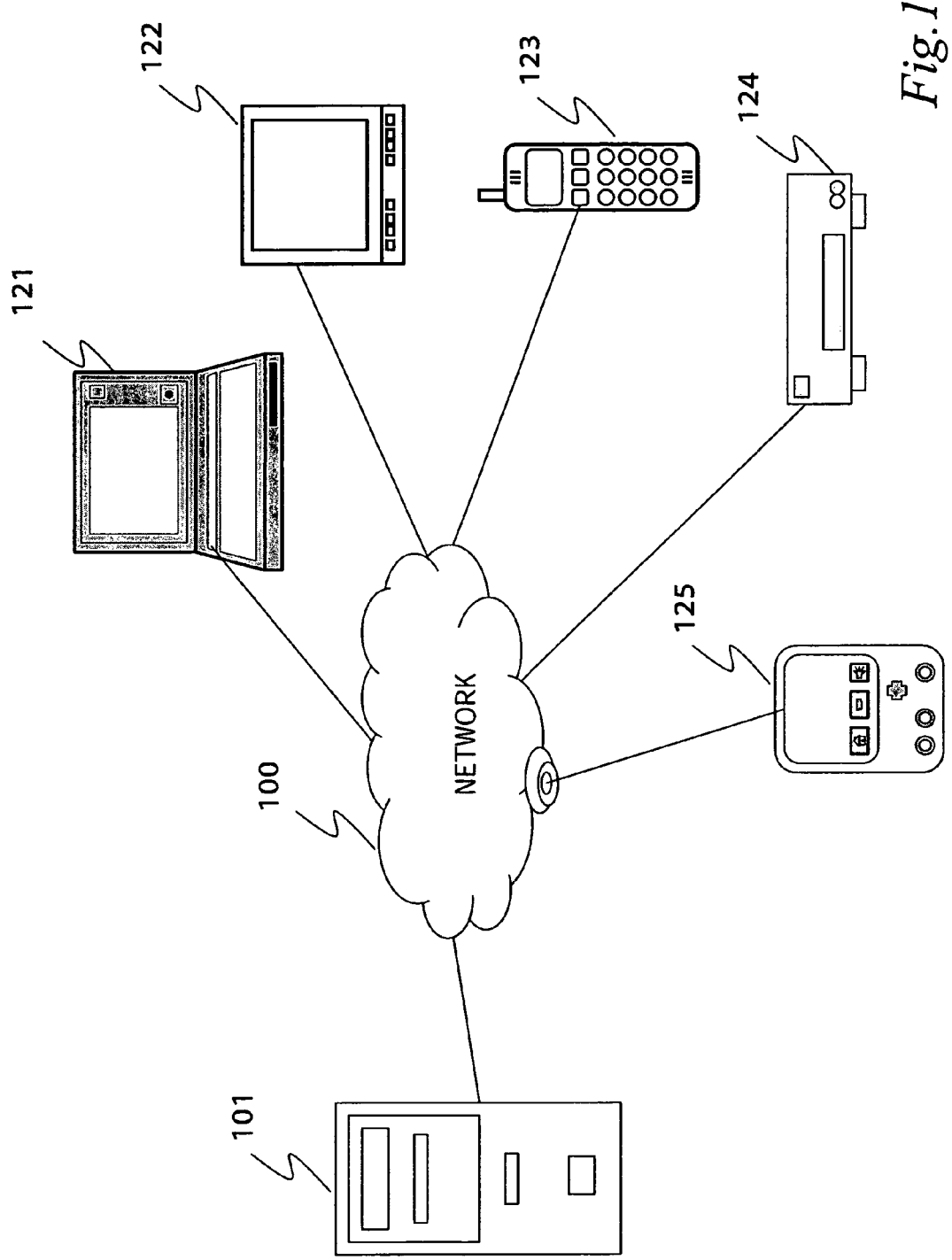
FIG. 1 is a diagram of a network configuration example to which the present invention can be applied.

Hereinafter, referring to the drawings, details of an information processing apparatus and an information processing method, and a computer program of the present invention are described.

[System Overview]

First, with reference to FIG. 1, the following describes an example of a network configuration to which the present invention can be applied. FIG. 1 shows a configuration, such as a home network configuration, in which a server 101 which executes processing in response to processing requests from various client apparatuses and a PC 121, a monitor 122, a mobile phone 123, a player 124, and a PDA 125 as the client apparatus that issue processing requests to the server 101 are connected via a network 100. Various other electronic devices and electrical household appliances can also be connected as a client apparatus.

Processing executed by the server 101 in response to a request from a client includes the provision of contents stored in storage means such as a hard disc owned by the server 101 or the provision of data processing services through the execution of an application program executable by the server. Although the server 101 and the client apparatus are shown as two separate devices in FIG. 1, only a device that provides a service in response to a request from a client is shown as a server. Any client apparatus that provides its own data processing service to other clients can provide the function as a server. Therefore, the client apparatus connected to the network shown in FIG. 1 can also act as a server.

The network 100 is a wired or wireless network, and the connected devices transmit and receive communication packets such as Ethernet (registered trademark) frames via the network 100. That is, a client issues a data processing request to the server 101 by transmitting an Ethernet frame with processing request information stored in a data portion of the frame, to the server 101. Upon receiving the processing request frame, the server 101 executes data processing, stores result data generated as a result of the data processing into the data portion of the communication packet as necessary, and transmits the packet to the client.

The devices connected to the network are, for example, devices conforming to Universal Plug and Play (UPnP). Therefore, devices can be added to and deleted from the network easily. A device newly connected to the network performs the following:

(1) Addressing processing for acquiring its own device ID such as an IP address (2) Discovery processing for searching for devices in the network and, upon receiving responses from the device, acquiring information, such as the device type and the function, included in the responses.

(3) Service request processing for requesting a device to provide a service based on the information acquired by the discovery processing By executing the processing procedure described above, the services by applying devices connected to the network can be received.

Figure 2:
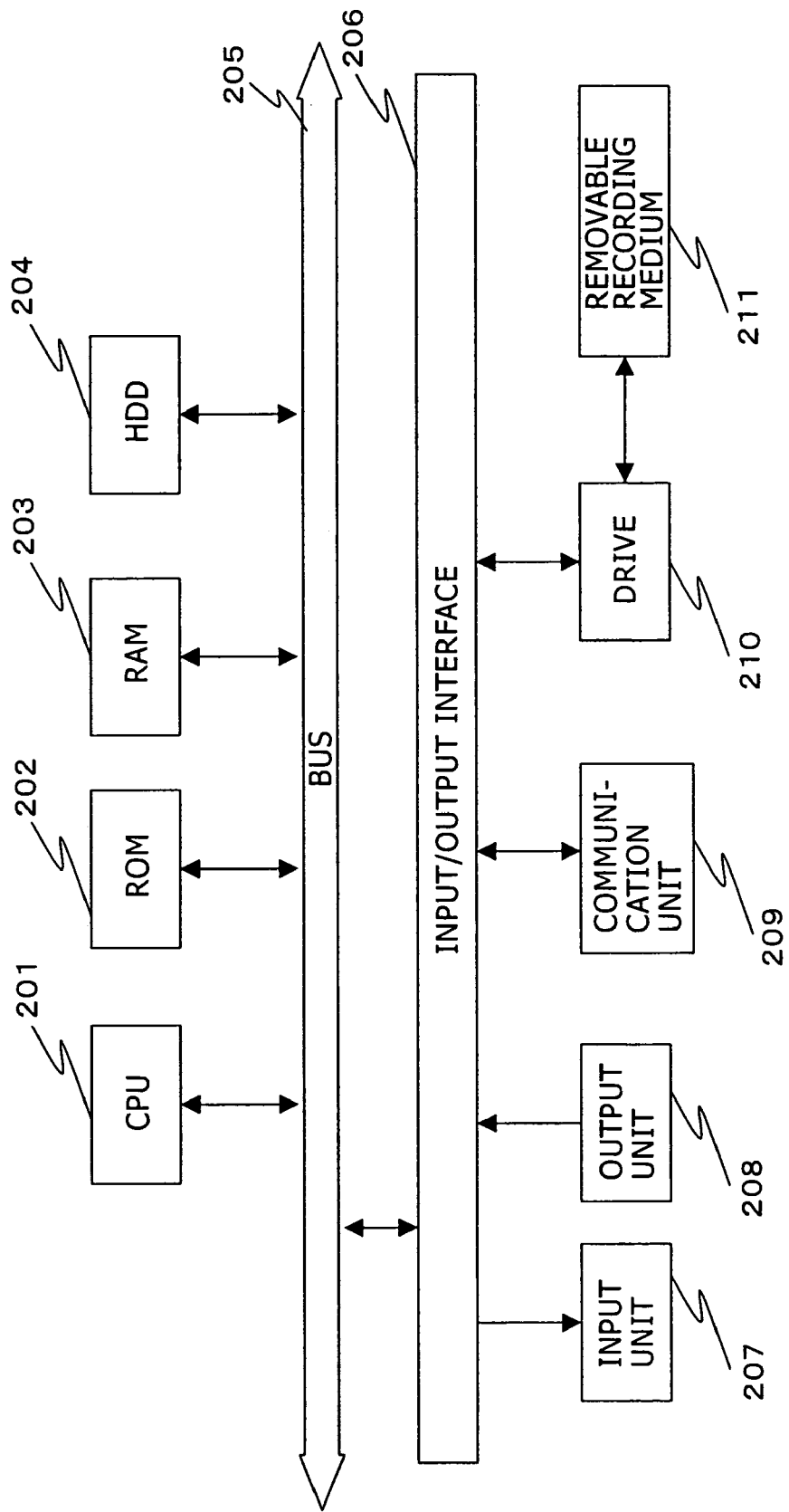
FIG. 2 is a diagram for explaining a configuration example of a network connection device.

With reference to FIG. 2, the following describes an example of the hardware configuration of a PC that is an example of an information processing apparatus composing the server and the client apparatus shown in FIG. 1.

A CPU (Central Processing Unit) 201 executes various types of processing according to the programs stored in a ROM (Read Only Memory) 202, an HDD 204 or the like to function as data processing means or communication control processing means. A RAM 203 stores programs to be executed by the CPU 201 as well as data as necessary. The CPU 201, ROM 202, RAM 203, and HDD 204 are interconnected via a bus 205.

An input/output interface 206 is connected to the bus 205. To this input/output interface 206 are connected an input unit 207, which is composed of a user-operated keyboard, switches, buttons, a mouse and the like, and an output unit 208 which is composed of an LCD, a CRT, and a speaker for presenting various types of information to a user. Also connected to this input/output interface 206 are a communication unit 209, which functions as data transmitting and receiving means, and a drive 210 to which a removable recording medium 211 such as a magnetic disc, an optical disc, an magnetic optical disc, or a semiconductor memory can be attached and which reads data from and writes data to the removable recording medium 211.

The configuration shown in FIG. 2 is an example of the server, or the personal computer (PC), that is an example of a device connected to the network shown in FIG. 1. The devices connected to the network are not limited to a PC but, as shown in FIG. 1, can include a portable communication terminal such as a mobile phone and a PDA and various electronic devices and an information processing apparatus such as a player and a display. Therefore, a device can have its own hardware configuration for executing processing according to the hardware.

[Metadata]

Next, the following describes metadata owned by the server in which contents to be provided to clients are stored. The server has attribute information as metadata, wherein the attribute information corresponds to the contents such as image data on still images and moving images and audio data such as music stored in its storage unit.

The contents such as image data like still images and moving images and audio data like- music owned by the server are called collectively as AV contents. The AV contents are managed by a hierarchically structured content directory in the server.

The content directory has a hierarchical structure composed of an individual AV content or folders which contains a plurality of AV contents. An element of the content directory, that is, each AV content or folder containing a plurality of AV contents is called an object. An object is a generic term for a data unit processed by the server and, in addition to an individual AV content or folder containing a plurality of AV contents, there are various objects.

The minimum unit of an AV content, such as one piece of music data, one piece of moving image data, or one piece of still image data, is called an item.

Objects are classified into classes, for example, music (Audio), video (Video), and photograph (Photo), according to the types, and each object is labeled as a class. A client can designate a specific class to search for only objects belonging to a specific classification and execute it. In the server, classes are managed also in a hierarchical structure with subclasses under each class.

Metadata is composed of various types of management information including attribute information corresponding to contents that the server has, class definition information, and hierarchical information composing the content directory. Metadata, which is the attribute information on a content defined corresponding to each object, includes various types of information such as an identifier (ID), data size, resource information, title, artist name, and copyright information of the content. Each piece of information included in metadata is called a property. What properties the metadata should have are previously defined for each of the classes described above such as music (Audio), video (Video), and photograph (Photo).

[Processing by Client Based on Acquired Property Information]

Figure 3:
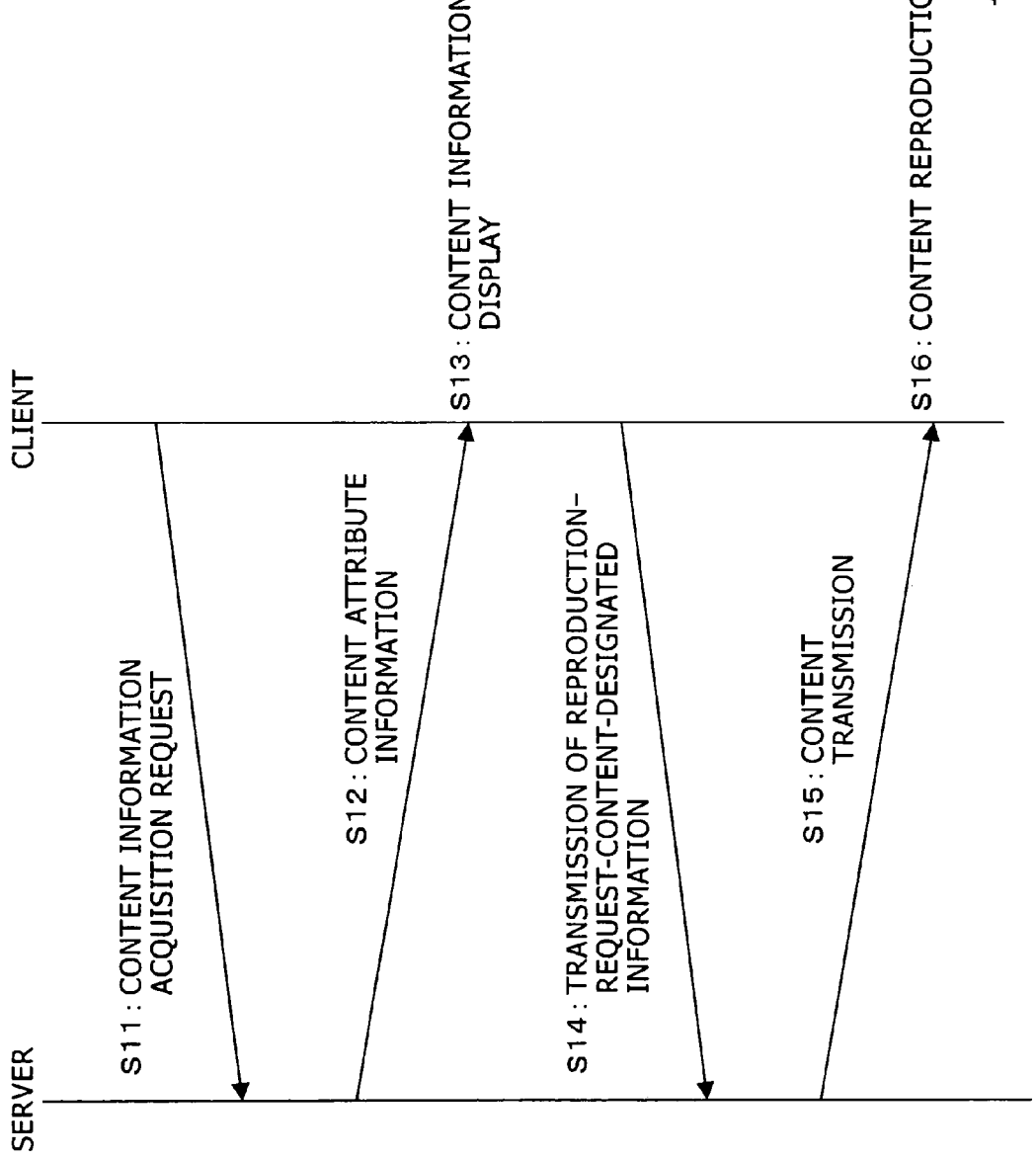
FIG. 3 is a diagram for explaining a processing sequence between a server and a client in content data reproduction processing.

For example, a client who wants to reproduce a content can transmit a content request to the server, receive the requested content from the server, and reproduce the received content. With reference to FIG. 3, the following describes a general content reproduction procedure. First, in step S11, the client transmits an acquisition request for content information owned by the server. In step S12, in response to the request from the client, the server uses XML (eXtensible Markup Language) data to generate content information, such as titles and artist names, based on the metadata corresponding to the contents, and then transmits the generated information to the client.

In step S13, the client displays the content information on the display according to the received XML information. For example, in the case of music contents, a list of music titles, artist names, reproduction times and the like, corresponding to a plurality of music pieces owned by the server, is displayed.

Next, in step S14, the client on the client apparatus selects a tune to be received from the server for reproduction and transmits the content-designation information (for example, content ID) to the server. The server acquires the content from the storage means based on the received content designation information and transmits the content. In step S16, the client reproduces the content received from the server. If compressed according to ATRAC, MPEG or the like, the content is decompressed and then reproduced on the client side.

The usual content reproduction procedure is as described above. The client can acquire various types of content attribute information, that is, property information included in metadata corresponding to contents owned by the server. This property information includes rewritable items. Accordingly, the user can rewrite the content information displayed on the client device, for example, the data on the content list, based on the XML information received from the server, or can perform addition or deletion processing of the data.

(Editing of Property Information)

In the structure of the present invention, in response to a request for the content information from a user, that is, a client to a server, XML data including data editing information is generated and transmitted to the client. The data editing information is allowed for each piece of property information included in the metadata corresponding to a content, and more specifically, it is data update enable/disable information which is composed of whether or not rewrite processing, addition processing, or deletion processing of the property information is enabled, and input-allowed data values, for example, a type of input-allowed data format, an allowed numeric range and the like.

Based on the XML data composed of the property information received from the server, for each piece of property information, the client machine generates display information (UI: user interface) in which the user can identify the various types of editing information such as whether or not rewrite processing or the like is enabled, the type of input-allowed data, and the numeric range of the data that can be inputted, and presents it as display information such as a content list on the display. Accordingly, the user can perform proper data update, based on the content information such as the content list in which the editing information can be identified.

The following describes a series of sequence in which the property information included in the metadata as attribute information of contents is transmitted from the server to the client, and the client machine displays the content information based on the received information to execute the data update processing.

Figure 4:
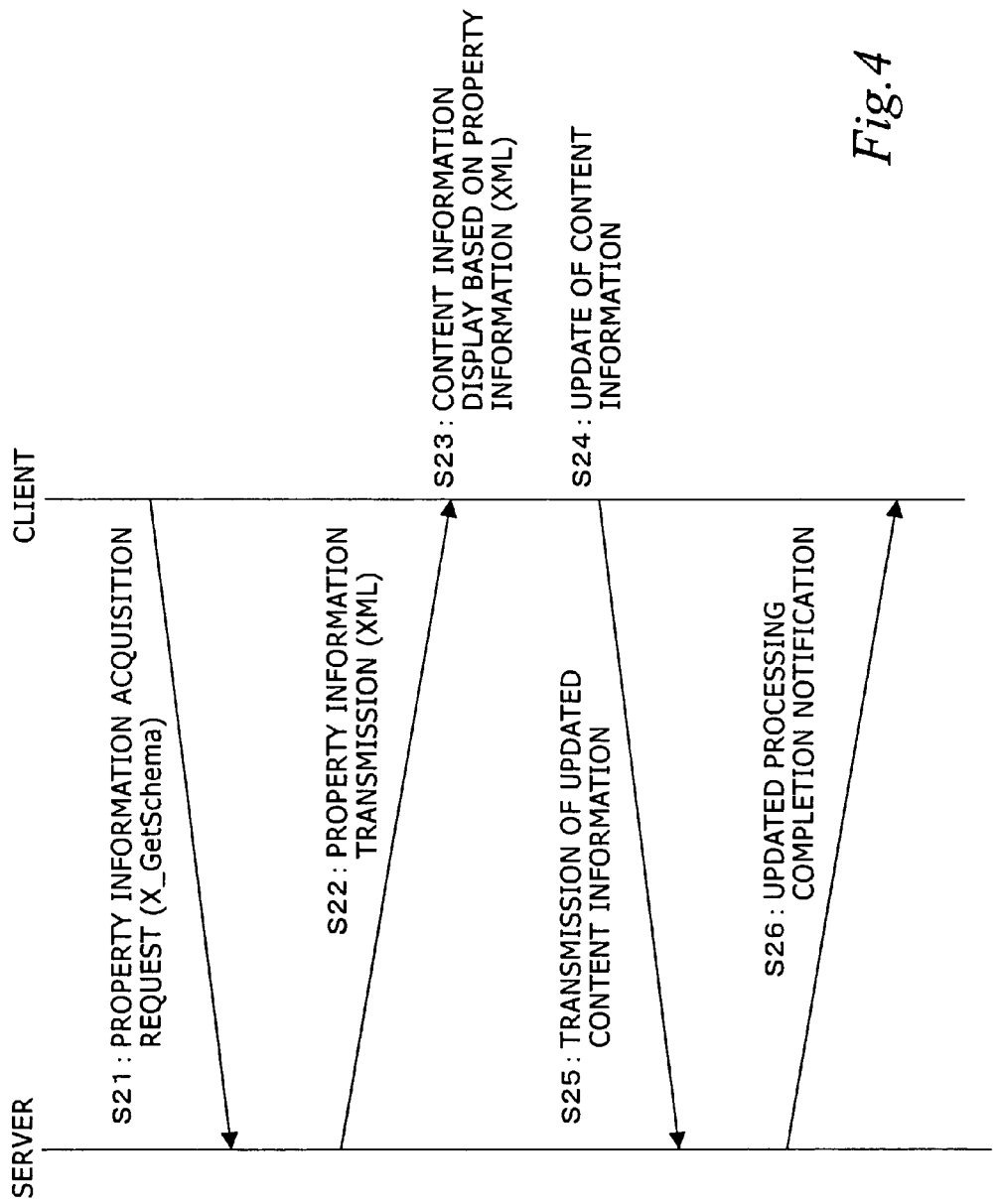
FIG. 4 is a diagram for explaining a processing sequence between the server and the client in property-information-update processing.

FIG. 4 shows a series of processing sequence between the server and the client in the update processing of the property information.

First, in step S21, the client requests content information owned by the server. Here, a command [X_GETSchema] is transmitted to the server. The command [X_GETSchema] is an interpretable command in the devices configuring the system of the present invention, and the server that has received this command generates XML data based on the property information composing the metadata corresponding to various objects such as contents according to the request.

The client can designate on which object, that is, on which type of contents the property information is acquired. The client designates one class from the above-described classes such as music (Audio), video (Video) and photograph (Photo), for example, and executes an acquisition request for the property information of the object included in the designated class. In this case, a class name is added to the command [X_GETSchema] and the command is transmitted to the server.

Upon receiving the acquisition request for the property information from the client, the server acquires, for example, the corresponding metadata of the contents corresponding to the designated class from the storage means, and based on the acquired metadata, generates the XML data including the property information to be transmitted to the client. The server transmits the generated XML data to the client in step S22.

In the structure of the present invention, in response to the request for the content information from the user, that is, the client to the server, for each piece of property information included in the metadata corresponding to the contents, the server generates the XML data including the data editing information as various types of data update enable/disable information composed of whether or not the rewrite processing, addition, deletion or the like is enabled, and input-allowed data format, data values that can be inputted and the like, and then transmits the XML data to the client.

Based on the XML data composed of the property information received from the server, for each piece of the property information, the client machine generates display screen (UI: user interface) on which the user can identify whether or not the rewrite processing, addition, deletion or the like is enabled, the input-allowed data format, and the data values that can be inputted and the like, and presents it on the display as the content information. Accordingly, displaying the content information such as a content list on the display allows the user to perform proper data update.

FIG. 5 shows an example of XML data composed of a plurality of pieces of property information included in metadata corresponding to a content, which is transmitted from the server to the client. In the structure of FIG. 5, each of the data portions 301, 302, 303, 304 is the XML data relevant to each piece of the property information composing the metadata.

For example, the data portion 301 has the following structure.

```
<av:PropertyInfo>
  <av:PropertyName>dc:title</av:PropertyName>
  <av:MinOccurred>1</av:MinOccurred>
  <av:MaxOccurred>1</av:MaxOccurred>
  <av:OperationCode>rcw</av:OperationCode>
</av:PropertyInfo>
```

The detailed meaning of the descriptive data of the XML data is shown in FIG. 6. <av:PropertyInfo> indicates the start of the property information. <av:PropertyName>dc:title</av:PropertyName> indicates that the name of the property is a title (title). <av:MinOccurred>1</av:MinOccurred> indicates an existing minimum value of this property information. <av:MaxOccurred>1</av:MaxOccurred> indicates an existing maximum value of this property information. The foregoing case indicates that the property [title] has one minimum and one maximum, that is, there surely exists one.

<av:OperationCode>rcw</av:OperationCode> is a processing code including the editing information of this property and has the following meaning.

r . . . Exist in an object returned from the server, such as Browse and Search c . . . Enabled to be designated at the time of CreateObject w . . . Enabled to be rewritten by UpdateObject a . . . Enabled to be increased by UpdateObject d . . . Enabled to be deleted by UpdateObject s . . . Enabled to be included in SortCriteria by Browse/Search The above-described property [title] is <av:OperationCode>rcw</av:OperationCode>, in which the setting of [w] is found. It is understandable that this property is data that can be rewritten by the user in the update processing (UpdateObject). </av:PropertyInfo> indicates the end of the property information.

The data portion 302 of FIG. 5 has the following structure.

```
<av:PropertyInfo>
  <av:PropertyName>upnp:artist</av:PropertyName>
  <av:MinOccurred>0</av:MinOccurred>
  <av:MaxOccurred>1</av:MaxOccurred>
  <av:OperationCode>rcwad</av:OperationCode>
</av:PropertyInfo>
```

In the above-described property information, the property name is [artist (artist)], which indicates it is property information of an artist. In <av:OperationCode>rcwad</av:OperationCode>, [r, C, w, a, d] is set, which indicates this is data that can be rewritten by the user in the update processing (UpdataObject), can be increased (a), and can be deleted (d).

The data portion 303 of FIG. 5 has the following structure.

```
<av:PropertyInfo>
  <av:PropertyName>av:recordQualityLevel</av:PropertyName>
  <av:MinOccurred>1</av:MinOccurred>
  <av:MaxOccurred>1</av:MaxOccurred>
  <av:OperationCode>rcw</av:OperationCode>
  <av:AllowedValueRange>
  <av:Minimum>3</av:Minimum>
  <av:Maximum>5</av:Maximum>
  <av:Step>1</av:Step>
  </av:AllowedValueRange>
</av:PropertyInfo>
```

The above-described data indicates a property [record quality level]. In this structure, the following is data indicating a range of values that are allowed in the property [record quality level] and its step (increment).

```
<av:AllowedValueRange>
  <av:Minimum>3</av:Minimum>
  <av:Maximum>5</av:Maximum>
  <av:Step>1</av:Step>
</av:AllowedValueRange>
```

That is, for the property [record quality level], the values of 3 to 5 can be set and the step is 1. Accordingly, it is understandable that the respective value of 3, 4, and 5 can be set as [record quality level].

The data portion 304 of FIG. 5 has the following data structure.

```
<av:PropertyInfo>
  <av:PropertyName>av:recordStatus</av:PropertyName>
  <av:MinOccurred>1</av:MinOccurred>
  <av:MaxOccurred>1</av:MaxOccurred>
  <av:OperationCode>r</av:OperationCode>
  <av:AllowedValueList>
    <av:AllowedValue>NotYet</av:AllowedValue>
    <av:AllowedValue>Timed</av:AllowedValue>
    <av:AllowedValue>Recording</av:AllowedValue>
    <av:AllowedValue>Recorded</av:AllowedValue>
  </av:AllowedValueList>
</av:PropertyInfo>
```

The above-described data is data regarding a property [record status (recordStatus)]. In this structure, the following is list data of values that are allowed in the property [record status (recordStatus)].

```
<av:AllowedValueList>
  <av:AllowedValue>NotYet</av:AllowedValue>
  <av:AllowedValue>Timed</av:AllowedValue>
  <av:AllowedValue>Recording</av:AllowedValue>
  <av:AllowedValue>Recorded</av:AllowedValue>
</av:AllowedValueList>
```

It is understandable that four values of (NotYet), (Timed), (Recording) and (Recording) are allowed in the property [record status (recordStatus)] as settable values.

In this manner, the property information transmitted from the server to the client includes modes in which the update processing is enabled, and the information of the settable values.

Back to FIG. 4, the description of the processing sequence between the server and the client is continued. When the server transmits the above-described XML data as shown in FIG. 5, for example, and the client receives it, the client machine displays a content information list based on the XML data, on the display of the client machine.

In the display processing of this content information list, the list display is executed, based on the modes in which the update processing is enabled and the information of settable values, which are set for each piece of the above-described property information. A display example of the content information list is shown in FIG. 7.

By setting the display differently, for example, displaying a rewritable area in white and displaying a non-rewritable area in gray, the user can understand which field is rewritable. The example shown in FIG. 7 is merely one example, and a structure in which by color display, fields that can be rewritten, added, and deleted are set in different colors may be employed. Furthermore, not only by color display but by various types of graphic processing, the respective fields may be set so that the editable modes of the respective fields can be identified.

Figure 7:
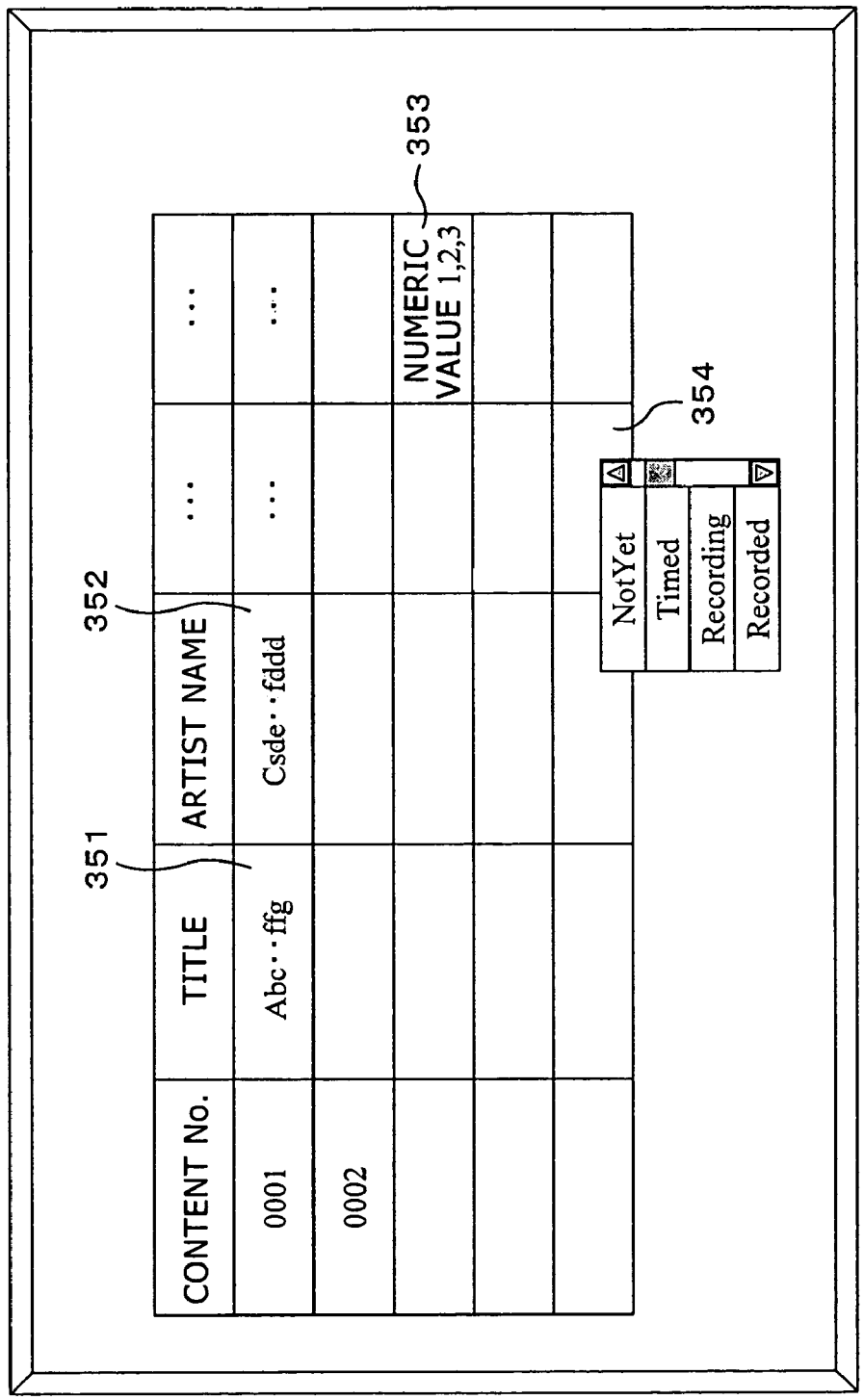
FIG. 7 is a diagram illustrating an example of a content information list displayed on a display based on XML data composed of property information transmitted from the server to the client.

For example, a field 351 as shown in FIG. 7 is a data field of rewritable property information, and a field 352 is a data field of property information which is not allowed to be rewritten. Furthermore, in a data field 353 of a property for which settable numeric values are defined, settable numeric data 1,2,3 are demonstrated, and further, for a field 354 in which the four values (NotYet), (Timed), (Recording), and (Recording) are defined as set table values, display processing for displaying a structure in which the settable values are presented as a combo box is possible. This is executed in the client machine, based on the XML data received from the server (refer to FIG. 5).

The display processing mode of the content list shown in FIG. 7 is one example, and various displays other than this display processing mode are possible. Note that the editing information corresponding to each piece of the property information received from the server, that is, various types of information such as whether or not rewrite is enabled, whether or not addition or deletion is enabled, the data format in which input is enabled, and settable values are displayed in a mode in which the user can identify them. This display processing allows the user to efficiently execute proper data update.

Back to the processing sequence between the server and the client in FIG. 5, the description is continued. In step S23, the client executes the content information display (for example, FIG. 7), based on the property information received from the server (XML data). As necessary, in each field, the data update such as the data rewrite, addition and deletion is executed.

Furthermore, in step S25, the property information including the updated data is transmitted to the server. The server stores the updated property information in its own storage unit. That is, the corresponding metadata of the content corresponding to the updated property information is overwritten with the updated property information to perform update processing of the metadata. In the server, the update processing is completed, and then, in step S26, an update-completion notification is transmitted to the client to thereby complete the property information update processing.

Figure 8:
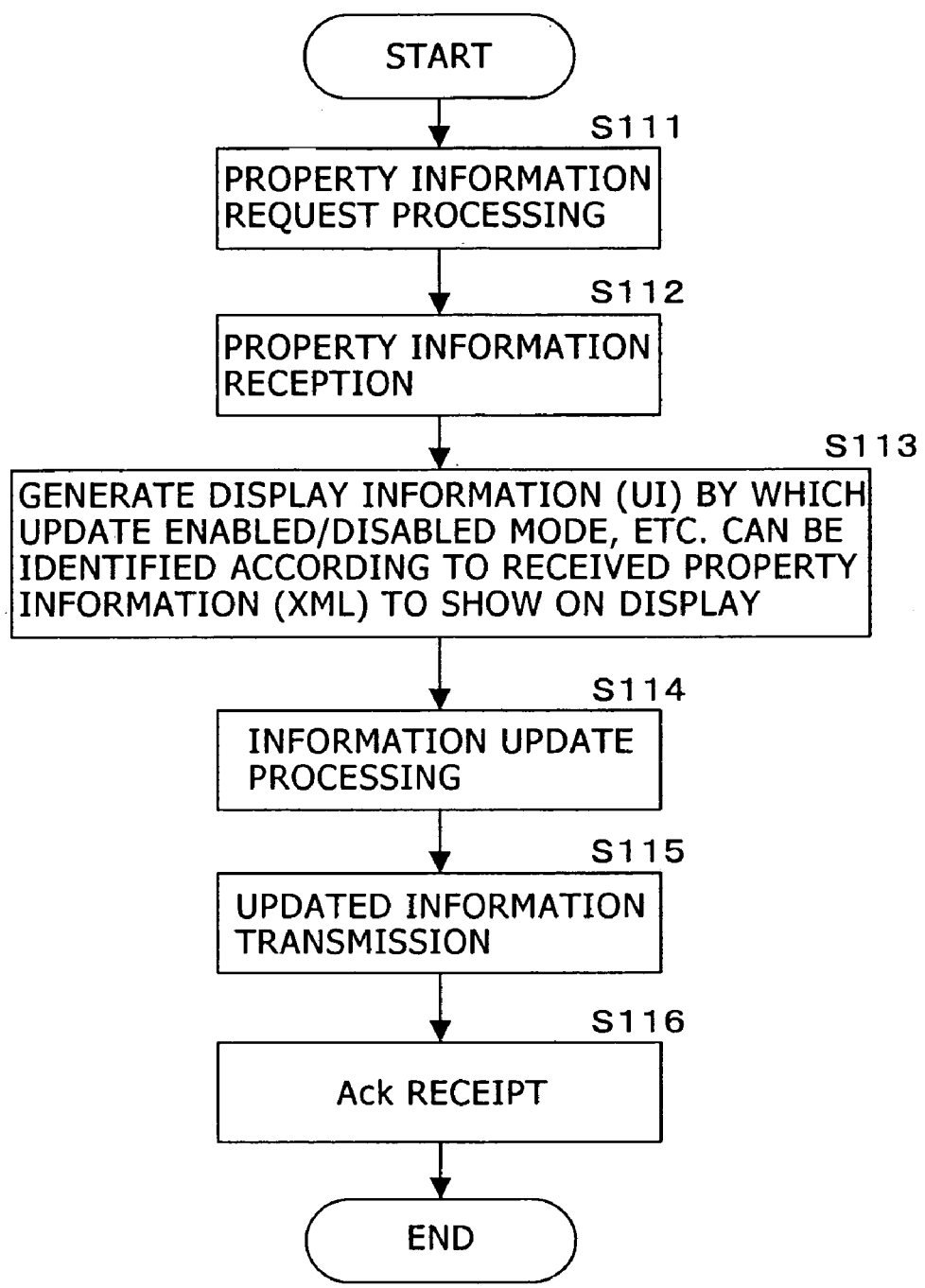
FIG. 8 is a diagram showing a flowchart for explaining a processing procedure of a client apparatus in data update processing of the property information transmitted from the server to the client.

Acquisition processing and update processing procedure of the property information in the client apparatus is described, referring to a processing flow of FIG. 8.

In step S111, the client apparatus performs an acquisition request for the property information to the server. As described above, this is executed as processing of transmitting the command [X_GETSchema], for example, with the class designation added, to the server.

In step S112, the client receives the property information from the server as the XML data, and in step S113, based on the received property information, the client generates the display information (UI) in which the user can identify the update enabled/disabled modes, that is, whether or not rewrite processing, addition processing, or deletion processing is enabled, an allowed data format, and allowable data values, and displays it on the display. The display information is, for example, the content list described with reference to FIG. 7.

The user, in step S114, the user-executes the data update processing to the content information displayed on the display of the client apparatus, and in step S115, transmits the updated information to the server. When the update processing in the server is completed, in step S116, a response as an update-processing-completion notification (Ack) is received to finish the processing.

As described above, the structure of the present invention is such that for an individual element composing metadata as attribute information of a content, that is, for each piece of the property information, its allowed-editing information is added to XML data, and transmitted from the server to the client, and in the client apparatus, based on the received XML data, a content information list in which the user can identify an editing permitting mode for each piece of the property information is generated and displayed as the user interface. Therefore the user can efficiently and surely execute proper editing processing with respect to each piece of the property information.

(Reproduction-Content Designation Based on Acquired Property Information)

As described above, in the structure of the present invention, the detailed property information is transmitted from the server to the client. The above description is given, focusing on the editing processing of the property information in the client, and the client can execute more proper content reproduction processing by receiving the detailed property information from the server.

When acquiring properties composing metadata corresponding to contents, as described above, the client can designate a class of contents that the server has to thereby acquire the property information.

In the server, the classes are each managed in a hierarchal structure, and subclasses as child classes of one class can be set. For example, various classes are set as classes relating to music (Music). As the classes relating to music (Music), for example, classes as shown in FIG. 9 are set.

As shown in FIG. 9, various classes such as tunes, albums, genres, album cabinets in each of which a plurality of albums are collected are set. The client designates these classes and transmits to the server, the above-described command [X_GETSchema] as a property information acquisition request, so that the property information of the contents corresponding to the designated class can be acquired.

The designation of the class allows the user to obtain information of what property can be treated in the class. Although not all objects in the designated class have common properties, in this case, the server returns only the common properties. For example, in a case where a subclass (1) of the designated class has properties (A) and (B), and a subclass (2) has properties A and C, the server returns only the property A which is common to both.

The client can also transmit, to the server, the command [X_GETSchema] as a property information acquisition request with no class designation. Upon receiving the [X_GETSchema] with no class designation, the server transmits listing information of the classes managed by the server to the client. This processing allows the client to acquire the class information managed by the server. In this manner, after acquiring the class information managed by the server, the client can transmit, to the server, the command [X_GETSchema] with a particular class designation, which enables the property information acquisition in which the class managed by the server is precisely designated.

As shown in FIG. 9, the classes are subjected to various classification, and the user can designate an arbitrary class to acquire the property information of the designated class.

Music contents and Image contents are stored in various modes in the server. That is, compressed data modes such as ATRAC3, ATRAC3plus, MPEG2, and MPEG4 are different depending on the stored contents. Also, the record quality, so-called record quality level of the contents is different.

Meanwhile, in the client apparatus, the data mode in which the data can be processed by its device is different. It is preferable that each of the clients receives the data with the highest quality which can be processed by itself and performs reproduction processing.

In the structure of the present invention, the property information transmitted from the server to the client also includes information regarding the data quality of the contents. The server generates content information including data mode information by which processing capability in the device on the client side can be determined and transmits the generated content information to the client.

The server stores the information regarding the data of a content as shown in FIG. 10, for example, as metadata corresponding to the content as property information, which is presented to the client in response to a property information acquisition request from the client.

FIG. 10 is a diagram showing an example of a part of the property information presented to the client. Property name (Property Name), data type (Type) such as numeric values and letter strings, multiple (Multiple) indicating whether or not multiple existence is enabled, and property description (Property Description) are shown. Total size (total Size) indicates size-data of an original content. Container indicates an object as a folder storing contents. Total duration (total Duration) indicates a total time of the content. Record quality level (record Quality Level) is data indicating a quality level which is a record quality of the content. For example, integer values of 1 to 7 are allowed, and are set in such a manner that 3=2 Mbps, 4=4 Mbps, 5=8 Mbps, etc.

Original file format (original File Format) indicates a format of the original content data before conversion. It is shown as MIMEType, for example. Original codec (Original Codec) indicates a codec as a coding data mode of the original content data before conversion.

Settable values as original codec (Original Codec) as a property, that is, allowed values (Allowed Value) are preset, as shown in FIG. 11. Namely, various setting allowed values such as MPEG1L3, ATRAC3, ATRAC3plus, . . . JPEG, . . . MPEG4V, which indicate various data compression processing modes, are defined in advance. The data compression processing modes corresponding to the respective allowed values (Allowed Value) are as shown in description (Description) of FIG. 11.

Back to FIG. 10, again the description of the property information is continued. Original resolution (original Resolution) is resolution information regarding original data of image data. Resource protocol information (res@protocolInfo) is information regarding a file format of a resource. [res] indicates that it is resource information. The server can have information obtained by converting the original data in various modes, as resource data, aside from the original data. The data after conversion is resource data.

Resource codec (res@av:codec) is coding data mode information regarding the resource data, for which various setting allowed values such as MPEG1L3, ATRAC3, ATRAC3plus . . . JPEG, . . . MPEG4V indicating the data compression processing modes as shown in FIG. 11, are defined in advance. Resource size (res@size) indicates a size of the resource data.

The property information shown in FIG. 10 is information that the server owns as attribution information corresponding to the content, and indicates a part of the information which can be provided to the client. Various types of content information other than those shown in this figure are provided from the server to the client according to the property information acquisition request from the client.

The client can receive and identify record quality level which is a data recording quality of a content that the client wants to reproduce, and details of codec information as coding modes, so that the client can select an optimal data mode in the client device to request the transmission. Therefore, reception and reproduction of optimal content data according to the client can be performed.

When the property information is transmitted from the server to the client, the client, based on the property information, identifies the optimal data mode for its own device according to the program stored in advance, and transmits content data transmission request in the identified data mode to the server.

Figure 12:
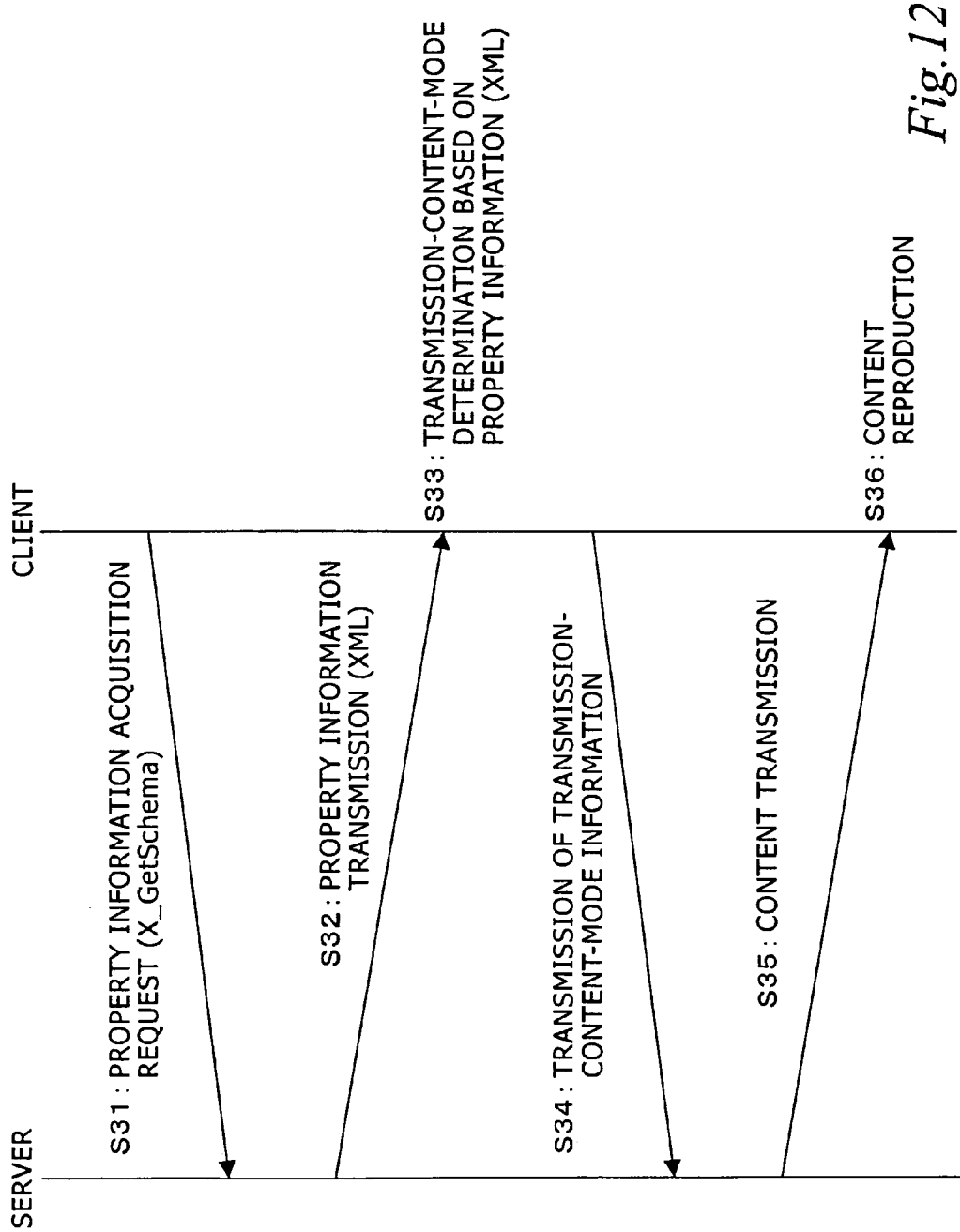
FIG. 12 is a diagram for a processing sequence between the server and the client in reproduction-data-designation processing based on the property information.

A transmission and reception processing sequence of a content is described referring to FIG. 12. First, in step S31, the client requests content information owned by the server. As described above, the command [X_GETSchema] is transmitted to the server. The client designates one class from the above-described classes such as music (Audio), video (Video), photograph (Photo) and executes an acquisition request for property information of objects included in the designated class. For example, the command [X_GETSchema] with a class name added is transmitted to the server.

Upon receiving the acquisition request for the property information from the client, the server acquires corresponding metadata of contents corresponding to the designated class, for example, from the storage means, and based on the acquired metadata, generates XML data including the property information to be transmitted to the client. Then, in step 32, the generated XML data is transmitted to the client.

In the structure of the present invention, in response to the request for content information from the user, that is, the client to the server, the server puts, into the property information, record quality level of the contents, and details of codec information as coding modes from metadata corresponding to the contents, and transmits the property information as XML data to the client. Specifically, the server generates the content information including data mode information by which processing capability in the device on the client side can be judged, that is, record quality level and codec information as coding modes as data mode information of the content data and transmits the generated content information to the client.

In step S33, based on the XML data composed of the property information received from the server, the client apparatus determines an optimal data mode in which the data can be reproduced as high quality data, for example, record quality level=3
codec=MPEG4 according to the codec of its own device, that is, a decoding processing function or the like. This determination processing of the transmission content data mode is automatically determined based on comparison between the property information corresponding to the contents received from the server and the function of its own device, according to the program stored in the client in advance.

However, a structure may be employed, in which the data mode information based on the property information is displayed on the display as the content information list described above with reference to FIG. 7, and the user selects a transmission content data mode, based on the content resource information.

In step S34, the determined content data mode information is transmitted from the client to the server, and the server, based on the received information, selects a resource content and, in step S35, transmits the content to the client. In step S36, the client executes the reproduction processing of the content received from the server.

In this manner, as the content information owned by the server, the client can receive the record quality level of the contents and the details of the codec information as codec modes, as the property information, so that optimal data selection suitable for the function of its own device, and high quality data reproduction can be realized.

[Functional Configurations of Server and Client]

The hardware configuration of the server and the client apparatus is as described above with reference to FIG. 2. The CPUs as control units execute the above-described various types of processing according to the programs stored in the respective storage units of the server and the client.

For the processing executed by the CPUs, for example, on the server side, the processing is such that according to a request from the client, the server acquires metadata corresponding to contents and generates XML data based on property information, and such that a content according to a requested data mode from the client is transmitted, etc. The processing on the client side is such that the client displays a content information list on the display based on the XML data composed of the property information received from the server. This processing includes generation processing of display information in which data editing information can be identified for each piece of the property information as component of the content information. Furthermore, the processing for determining a data mode of the content to be requested to the server based on the function of its own device and content resource information, and further the reproduction control processing of the received content and the like are executed.

Basically, the above-described processing is executed under control of the CPUs as the control units of the server and the client apparatus, and a functional configuration of the server and a functional configuration of the client required for the execution of the above-described processing are described with reference to FIGS. 13 and 14.

Figure 13:
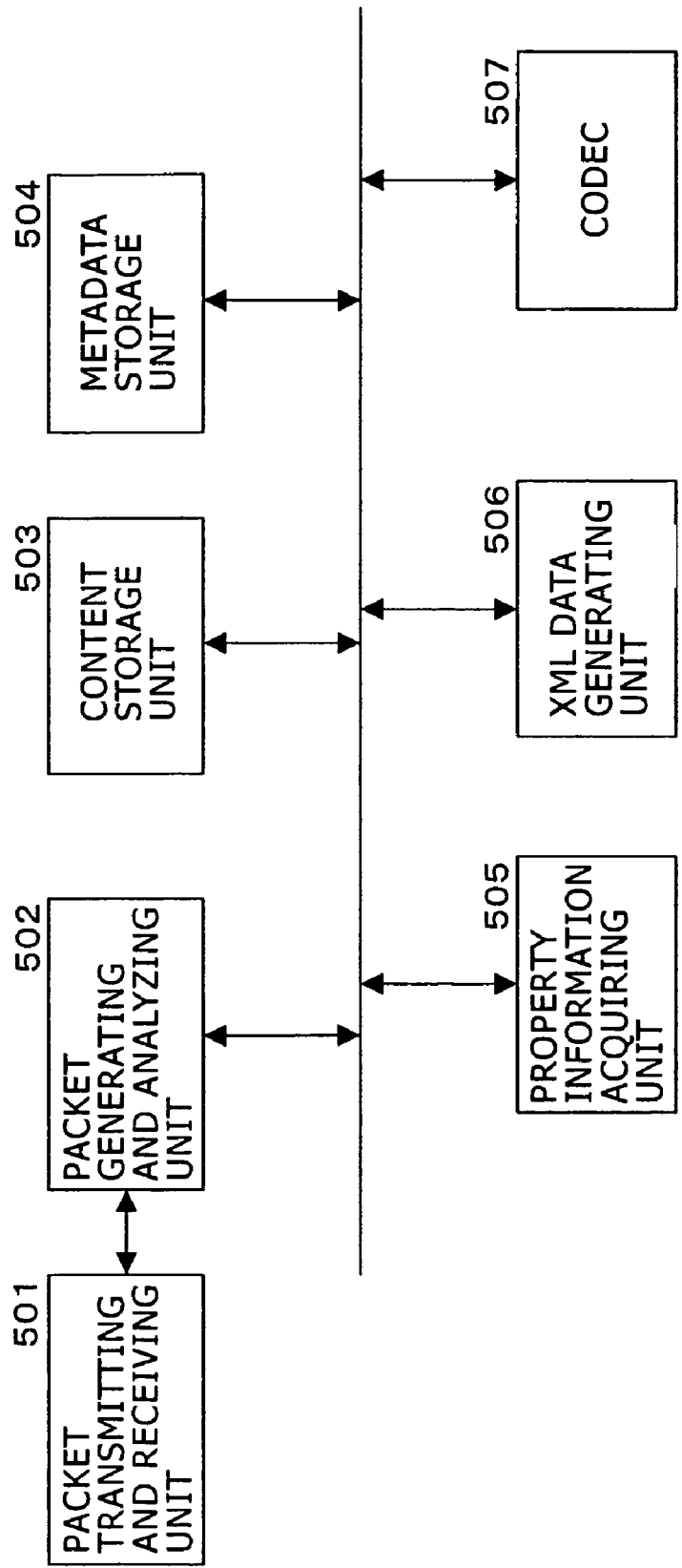
FIG. 13 is a block diagram for explaining a processing function of the server.

FIG. 13 is a block diagram showing a main functional configuration of the server. A packet sending and receiving unit 501 receives a packet to the client and a packet from the client. A packet generating and analyzing unit 502 performs generation processing of a send packet, and analysis processing of a receive packet. The processing includes address setting of the packet, address identification, data storage in a data portion, data acquisition processing from the data portion and the like.

A content storage unit 503 stores the contents owned by the server. The contents include original contents and content data obtained by performing data conversion for the original contents. A metadata storage unit 504 is a storage unit storing metadata as attribute information corresponding to the contents.

In the metadata storage unit 504, as described above, the property information composed of the metadata is stored and editing enable/disable information of each piece of property information, for example, the data editing information, such as information of whether or not rewrite is enabled, whether or not addition or deletion is enabled, etc. and input-allowed data format information, input-allowed data value information, etc. is included.

Furthermore, as described above, the property information indicating the data modes of the contents, that is, the content data modes such as the record quality level and the codec information is also included.

A property information acquiring unit 505, based on a property information acquisition request received from the client, for example, based on a packet with a class name added to the command [X_GETSchema], executes processing for taking out metadata corresponding to a designated class from the metadata storage unit 504.

An XML data generating unit 506 generates XLM data to be transmitted to the client, based on the metadata acquired by the property information acquiring unit 505. The XML data shown in FIG. 5 is one example. A codec 507 executes coding processing and decoding processing of original content data. Data conversion, for example, based on ATRAC3 and MPEG4 is executed. Each of the servers has a different codec function and thus, according to the function, resource data that can be provided to the client is also different.

Next, the functional configuration of the client apparatus is described with reference to FIG. 14. A packet sending and receiving unit 601 receives a packet to the server and a packet from the server. A packet generating and analyzing unit 602 performs generation processing of a send packet, and analysis processing of a receive packet. The processing includes not only stored data analysis in the packet, but processing such as address setting of the packet, address identification, data storage for a data portion, data acquisition processing from the data portion.

A storage unit 603 stores the content included in the packet received from the server, and codec information of the client.

An output unit 604 includes a speaker and a display applied to content reproduction processing. The display is also used to output the content information list described above with reference to FIG. 7. An input unit 605 is, for example, a keyboard or other data input means for executing the input of editing information into the content information list, that is, rewrite, addition, and deletion processing of the property information.

An XML data analyzing unit 606 analyzes the XML data composed of the property information, which is received from the server, and based on the analyzed data, generates the content information list described above with reference to FIG. 7 to execute processing for outputting the content information list to the display as the output unit.

A received data mode determining unit 607 executes processing for determining an optimal data mode to be received from the server, based on comparison between the property information received form the server, that is, the property information such as the record quality level of the contents and the codec information as coding modes, and the function of its own device.

A codec 608 executes decoding processing of the content data received from the server, or the like. For example, data conversion based on ATRAC3, MPEG4, for example, is executed. A structure may be employed, in which re-coding processing of the decoded data is executed and the processing for storing the re-coded data in the storage unit 603 is executed.

In a functional point of view, the server and the client have the respective functions as shown in FIGS. 13 and 14, and execute the above-described processing. However, note that block diagrams shown in FIGS. 13 and 14 are block diagrams for explaining the functions, and that actually, various processing programs are executed under control of the CPUs in the configuration of the hardware such as the PC shown in FIG. 2.

With reference to particular examples, the present invention has been described in detail. However, it is obvious that those skilled in the art can make modifications and substitutions of the examples within the scope not departing from the gist of the present invention. That is, the present invention is disclosed merely in an exemplified form, which should not be limitedly construed. In order to judge the gist of the present invention, claims should be referred to.

The series of processing described in the specification can be executed by hardware or software, or a composite configuration of both. In the case where the processing by the software is executed, a program with a processing sequence recorded is installed in a memory in a computer, which is incorporated into dedicated hardware, and is executed by the computer, or the program can be installed in a general-purpose computer which can execute various types of processing and executed by this computer.

For example, the program can be prerecorded on a hard disc or ROM (Read Only Memory) as a recording medium. Alternatively, the program can be temporarily or permanently stored (recorded) on a removable recording medium such as a flexible disc, CD-ROM (compact Disc Read Only Memory), MO (Magneto optical) disc, DVD (Digital Versatile Disc), magnetic disc, and semiconductor memory. Such removable recording media can be provided as so-called package software.

The program can be not only installed from the above-described removable recording media to the computer, but the program can be wirelessly transferred from a download site to the computer, or wiredly transferred to the computer via a network such as LAN (Local Area Network) and the internet, and the computer can receive the program transferred in such a manner and install it in a recording medium such as an incorporated hard disc.

The various types of processing described in the specification are not only executed in chronological order according to the description, but may be executed in parallel or individually, depending on processing capability of the apparatus executing the processing, or as necessary. Furthermore, the system in the present specification has a logical assembly configuration of a plurality of devices, and the devices having the respective configuration are not necessarily within the same housing.

INDUSTRIAL APPLICABILITY

As described above, according to the structure of the present invention, a server owning attribution information of contents is configured so as to extract metadata corresponding to the contents, based on the receipt of a content information acquisition request from a client, and to generate content information based on property information as component of the metadata, and is configured such that data editing information allowed by each piece of the property information is set for each property and transmitted to the client. Therefore, the client can efficiently and surely execute proper editing processing of the property information based on the received information.

Furthermore, according to the structure of the present invention, the client side receiving the content information from the server is configured so as to execute generation processing of display information in which the data editing information can be identified for each piece of the property information as component of the received content information and to display the display information on the display. Therefore, the client can efficiently and surely execute proper editing processing of the property information based on the received information.

Furthermore, according to the present invention, the structure is such that the server generates the content information including data mode information by which processing capability in the device on the client side can be judged, such as record quality level information indicating content recording quality or codec information indicating content coding modes, as the data mode information of the content data which can be transmitted from the server to the client, and that the content information is transmitted to the client. Therefore, the client can efficiently execute proper content selection processing based on the received information.

Furthermore, according to the present invention, the structure is such that the metadata as the content attribute information managed on the server side is managed based on class set as content classification. Therefore, acquisition processing of the property information with class designation from the client side is enabled, and thus, various classes such as tunes, albums, genres and album cabinets in each of which a plurality of albums are collected can be designated to acquire the property information.

The invention claimed is:

1. An information processing apparatus for transmitting content data in response to a content transmission request from a client, the apparatus comprising:
   a data transmitting and receiving unit executing data transmission and reception processing with the client via a network;
   a content storage unit storing content;
   a content management unit managing content stored in the content storage unit;
   a metadata storage unit storing metadata as content attribute information including a range of acceptable values associated with the stored content, the metadata including increment information indicating an acceptable increment within the range of acceptable values, the range having a maximum value and a minimum value;
   a property information acquisition unit extracting, from the metadata storage unit, property information including the metadata;
   a codec setting unit for associating codec information with the stored content, the codec information describing a type of coding used to code the content; and
   a transmission data generation unit generating data to be transmitted to the client, based on the property information acquired by the property information acquisition unit;
   wherein the content management unit executes content management by:
      defining individual content as an object;
      storing, in a folder, contents defined as objects;
      defining a class to indicate category classification of the object;
      defining classes as a hierarchical structure;
      setting the class indicating the category classification of each of the objects; and
      managing the objects by using a content directory having the hierarchical structure;
   the metadata storage unit storing with respect to each of the objects:
      property information including:
         identification information of the object;
         class information indicating the category classification of the object; and
         information relating to the hierarchical structure of the content directory corresponding to the category classification of the object;
   the property information acquisition unit extracting the property information of a classified object in response to a property information acquisition request with class designation, the request made by the client and received by the data transmitting and receiving unit;
   the transmission data generation unit generating transmission data including:
      the property information extracted by the property information acquisition unit and the codec information; and
      information of at least one allowable value selected from the range and settable as data of the extracted property information, the at least one allowable value being included to be displayed separate from an input value to indicate that the input value is allowed to be inputted, the input value corresponding to the content data; and
   the data transmitting and receiving unit transmitting the transmission data generated by the transmission data generation unit to the client.

2. The information processing apparatus according to claim 1, wherein the transmission data is generated as XML (eXtensible Markup Language).

3. The information processing apparatus according to claim 1, wherein, when the data transmitting and receiving unit receives a property information acquisition request without class designation from the client, the transmission data generation unit generates listing information of the class managed by the content management unit as transmission data to the client.

4. The information processing apparatus according to claim 1, wherein, the transmission data generation unit generates transmission data including information related to a data compression processing mode based on the codec information.

5. An information processing method for executing content data transmission processing in response to a content transmission request from a client, the method being executed by an information processing apparatus and comprising:
  managing objects by using a content directory having a hierarchical structure;
  defining an individual content as an object and defining a folder composed of contents;
  defining a class as information indicating category classification of the object;
  defining classes as a hierarchical structure;
  setting the classes to indicate category classification of each of the objects;
  managing property information corresponding to the objects, the property information comprising individual information including:
    metadata as attribute information of the object, the attribute information including a range of acceptable values associated with the objects and further including increment information indicating an acceptable increment within the range of acceptable values, the range having a maximum value and a minimum value;
    identification information of the object;
    class information indicating category classification of the object; and
    information related to the hierarchical structure of the content directory corresponding to the category classification of the object;
  associating codec information with the object, the codec information describing a type of coding used to code the object;
  receiving a property information acquisition request with class designation from the client;
  extracting property information of individual objects included in a designated class;
  generating transmission data including the codec information, the extracted property information and information of at least one allowable value selected from the range and settable as data of the extracted property information, the at least one allowable value being generated to be displayed separate from an input value to indicate that the input value is allowed to be inputted, the input value corresponding to the content data; and
  transmitting the generated transmission data to the client.

6. An information processing apparatus for performing acquisition processing of content information, the apparatus comprising:
  a data transmitting and receiving unit executing data transmission and reception processing with a server owning the content information, wherein the data transmitting and receiving unit receives codec information from the server, the codec information describing a type of coding used to code the content information;
  a control unit processing the content information received from the server based on the codec information and generating display information to be displayed on an output unit based on the content information received from the server;
  a display unit outputting and displaying the display information generated by the control unit, the display information including a range of acceptable values associated with the received content information and further including increment information indicating an acceptable increment within the range of acceptable values, the range having a maximum value and a minimum value,
  wherein the control unit generates the display information by including data editing information for each piece of property information corresponding to the content information received from the server, the data editing information being included to be displayed separate from one of the pieces of property information corresponding to the received content to indicate whether the one piece of property information is editable, and the data editing information further indicating that an additional piece of the property information is not editable;
  a content management unit managing the content information by:
    defining individual content as an object;
    storing, in a folder, contents defined as objects;
    defining a class to indicate category classification of the object;
    defining classes as a hierarchical structure;
    setting the class indicating the category classification of each of the objects; and
    managing the objects by using a content directory having the hierarchical structure; and
  a metadata storage unit storing with respect to each of the objects:
    property information including:
      identification information of the object;
      class information indicating the category classification of the object; and
      information relating to the hierarchical structure of the content directory corresponding to the category classification of the object.

7. The information processing apparatus according to claim 6, wherein, the content information received from the server is XML (eXtensible Markup Language) data in which the data editing information is described for each property, and the control unit analyzes the XML data to identify, during generation of the display information, the data editing information for each piece of property information.

8. The information processing apparatus according to claim 6, wherein:
  the data editing information includes information indicating whether or not at least one of rewrite processing, addition processing, and deletion processing of the property information is enabled; and
  the control unit generates the display information including a mode indicating whether or not the at least one of rewrite processing, addition processing, and deletion processing is enabled.

9. The information processing apparatus according to claim 6, wherein:
  the data editing information includes information defining an allowed data value of the property information; and
  the control unit generates display information having a mode in which the allowed data value is able to be identified for each piece of the property information.

10. An information processing apparatus for executing content information transmission processing, the apparatus comprising:
  a storage unit storing contents and metadata as content attribute information, the content attribute information including a range of acceptable values associated with the stored contents and further including increment information indicating an acceptable increment within the range of acceptable values, the range having a maximum value and a minimum value;

a codec unit associating codec information with the stored contents, the codec information describing a type of coding used to code the stored contents;

a data transmitting and receiving unit executing data transmission and reception processing with a client as a content information request apparatus; and a control unit extracting the metadata and the codec information from the storage unit in response to receipt of a content information acquisition request from the client, and generating content information to be transmitted to the client based on property information including the metadata, wherein the control unit includes data mode information in the generated content information, the mode information being included to judge processing capability of a device of the client with respect to the content information to be transmitted to the client; and the generated content information is transmitted via the data transmitting and receiving unit.

11. The information processing apparatus according to claim 10, wherein the control unit includes listing information of the class managed in the information processing apparatus as transmission information to the client, when a content information acquisition request from the client, does not include a class designation.

12. An information processing method for executing content information transmission processing, the apparatus comprising:

receiving a content information acquisition request from a client;

generating content information to be transmitted to the client based on property information including metadata;

associating codec information with the content information, the codec information describing a type of coding used to code the content information;

extracting the metadata as content attribute information from a storage unit, the content attribute information including a range of acceptable values associated with the content information and further including increment information indicating an acceptable increment within the range of acceptable values, the range having a maximum value and a minimum value; and transmitting the generated content information, the codec information, and the metadata to the client via a data transmitting and receiving unit, wherein when the content information acquisition request includes class designation as content classification, property information common to a designated class is extracted, and data editing information is included in the generated content information, the data editing information being included to be displayed separate from the property information to indicate whether the property information is editable, and the data editing information further indicating that an additional piece of property information is not editable.

13. The information processing method according to claim 12, wherein the data editing information is described for each property by using XML (eXtensible Markup Language).

14. The information processing method according to claim 12, wherein listing information of the class managed in an information processing apparatus is generated as transmission information to the client, when a content information acquisition request, from the client, does not include a class designation.

15. The information processing method according to claim 12, wherein the data editing information includes information indicating whether or not at least one of rewrite processing, addition processing, and deletion processing of the property information is enabled.

16. The information processing method according to claim 12, wherein the data editing information includes information defining an allowed data value of the property information.

17. An information processing method for executing acquisition processing of content information, the method being executed by an information processing apparatus and comprising:

receiving content information from a server via a data transmitting and receiving unit;

receiving codec information associated with the content information, the codec information describing a type of coding used to code the content information;

receiving a range of acceptable values associated with the content information;

receiving increment information indicating an acceptable increment within the range of acceptable values, the range having a maximum value and a minimum value;

processing the content information based on the codec information;

generating display information displayed on an output unit based on the processed content information; and outputting and displaying the display information, the display information including the range of acceptable values and the acceptable increment, wherein data editing information is included in the display information for each piece of property information received from the server, the data editing information being included to be displayed separate from one of the received pieces of property information to indicate whether the one received piece of property information is editable, and the data editing information further indicating that an additional received piece of the property information is not editable.

18. The information processing method according to claim 17, wherein:

the content information received from the server is XML (eXtensible Markup Language) data describing the data editing information for each property; and data editing information for each piece of property information is identified by analyzing the XML data.

19. The information processing method according to claim 17, wherein:

the data editing information includes information indicating whether or not at least one of rewrite processing, addition processing, and deletion processing of the property information is enabled; and the display information includes a mode identifying whether or not at least one of rewrite processing, addition processing, and deletion processing is enabled.

20. The information processing method according to claim 17, wherein:

the data editing information includes information defining an allowed data format of the property information; and the display information includes a mode identifying the allowed data format for each piece of the property information.

21. The information processing method according to claim 17, wherein:

the data editing information includes information defining an allowed data value of the property information; and the display information includes a mode identifying the allowed data value for each piece of the property information.

22. An information processing method for executing content information transmission processing, the method being executed by an information processing apparatus and comprising:
receiving a content information acquisition request from a client;
generating content information to be transmitted to the client based on property information including metadata;
associating codec information with the content information, the codec information describing a type of coding used to code the content information;
extracting the metadata as content attribute information from a storage unit, the content attribute information including a range of acceptable values associated with the content information and further including increment information indicating an acceptable increment within the range of acceptable values, the range having a maximum value and a minimum value; and
transmitting the generated content information, the codec information, and the metadata to the client via a data transmitting and receiving unit,
wherein when the content information acquisition request from the client includes class designation as content classification, property information common to a designated class is extracted, and based on the extracted property information, the content information includes data mode information to judge processing capability of a device of the client with respect to the content information transmitted to the client.

23. The information processing method according to claim 22, wherein the transmitted content information includes listing information of the class managed in an information processing apparatus in response to receipt of a content information acquisition request with no class designation from the client.

24. A computer-readable storage medium, storing a computer program, which when executed on a processor, causes the processor to perform a method for executing content information transmission processing, the method comprising:
receiving a content information acquisition request from a client;
generating content information to be transmitted to the client based on property information including metadata;
associating codec information with the content information, the codec information describing a type of coding used to code the content information;
extracting the metadata as content attribution information from a storage unit, the content attribute information including a range of acceptable values associated with the content information and further including increment information indicating an acceptable increment within the range of acceptable values, the range having a maximum value and a minimum value; and
transmitting the generated content information, the codec information, and the metadata to the client via a data transmitting and receiving unit,
wherein when the content information acquisition request includes class designation set as content classification, property information common to a designated class is extracted, and data editing information is included in the generated content information, the data editing information being included to be displayed separate from the property information to indicate whether the property information is editable, and the data editing information further indicating that an additional piece of property information is not editable.

25. A computer-readable storage medium, storing a computer program, which when executed on a processor, causes the processor to perform a method for executing acquisition processing of content information, the method comprising:
receiving content information from a server;
receiving codec information associated with the content information, the codec information describing a type of coding used to code the content information;
receiving a range of acceptable values associated with the content information;
receiving increment information indicating an acceptable increment within the range of acceptable values, the range having a maximum value and a minimum value;
processing the content information based on the codec information;
generating display information displayed on an output unit based on the processed content information; and
outputting and displaying the display information, the display information including the range of acceptable values and the acceptable increment,
wherein data editing information is included in the display information for each piece of property information received from the server, the data editing information being included to be displayed separate from one of the received pieces of property information to indicate whether the one received piece of property information is editable, and the data editing information further indicating that an additional received piece of the property information is not editable.

26. A computer-readable storage medium, storing a computer program, which when executed on a processor, causes the processor to perform a method for executing content information transmission processing, the method comprising:
receiving a content information acquisition request from a client;
generating content information to be transmitted to the client based on property information including metadata;
associating codec information with the content information, the codec information describing a type of coding used to code the content information;
extracting the metadata as content attribution information from a storage unit, the content attribute information including a range of acceptable values associated with the content information and further including increment information indicating an acceptable increment within the range of acceptable values, the range having a maximum value and a minimum value; and
transmitting the generated content information, the codec information, and the metadata to the client via a data transmitting and receiving unit,
wherein when the content information acquisition request from the client includes class designation as content classification, property information common to a designated class is extracted, and based on the extracted property information, the content information includes data mode information to judge processing capability of a device of the client with respect to the content information transmitted to the client.

* * * * *